United States Patent
Oizumi et al.

(10) Patent No.: US 7,495,727 B2
(45) Date of Patent: Feb. 24, 2009

(54) TRANSFLECTIVE LIQUID CRYSTAL DISPLAY DEVICE HAVING LIQUID CRYSTAL LAYER WITH MUCH LARGER TRANSMISSIVE RETARDATION THAN REFLECTIVE RETARDATION

(75) Inventors: Mitsuo Oizumi, Fukushima-ken (JP); Mitsuro Kano, Fukushima-ken (JP); Yuzo Hayashi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 407 days.

(21) Appl. No.: 11/318,329

(22) Filed: Dec. 23, 2005

(65) Prior Publication Data

US 2006/0192914 A1 Aug. 31, 2006

(30) Foreign Application Priority Data

| Dec. 27, 2004 | (JP) | ............................. 2004-375486 |
| Dec. 13, 2005 | (JP) | ............................. 2005-358412 |

(51) Int. Cl.
*G02F 1/1335* (2006.01)
(52) U.S. Cl. .................. 349/114; 349/113; 349/119
(58) Field of Classification Search ......... 349/117–121, 349/113–115
See application file for complete search history.

(56) References Cited

U.S. PATENT DOCUMENTS

| 6,611,306 B2 * | 8/2003 | Baek .......................... 349/117 |
| 2004/0032555 A1 | 2/2004 | Jin et al. |
| 2004/0125323 A1 | 7/2004 | Park et al. |
| 2006/0139534 A1 * | 6/2006 | Oizumi ....................... 349/117 |

FOREIGN PATENT DOCUMENTS

| EP | 1 326 129 | 7/2003 |
| JP | A1 09-146086 | 6/1997 |
| JP | 2003/121848 | 4/2003 |

OTHER PUBLICATIONS

Search Report dated Apr. 6, 2006 for corresponding European Patent Application 05 02 8241.
*P-105: A Single-Cell-Gap Transflective Display*, Y. J. Lim et al., May 25, 2004, 2004 SID International Symposium, Seattle, WA, pp. 662-664 (XP-007012142).
*P-114: Design of a Transflective LCD in the OCB Mode*, Seong-Ryong Lee et al., May 24, 2005, 2005 SID International Symposium, Boston, MA, pp. 734-737 (XP-007012539).
*A Multimode-Type Transflective Liquid Crystal Display Using the Hybrid-Aligned Nematic and Parallel-Rubbed Vertically Aligned Modes*, Seo Hern Lee et al., Aug. 2003, Japanese Journal of Applied Physics, Japan Society of Applied Physics, Tokyo, Japan, vol. 42, No. 8, Part 1, pp. 5127-5132 (XP-001191437).

\* cited by examiner

*Primary Examiner*—Andrew Schechter
*Assistant Examiner*—Dzu Luong
(74) *Attorney, Agent, or Firm*—Brinks Hofer Gilson & Lione

(57) ABSTRACT

A liquid crystal display apparatus includes a liquid crystal cell, first and second phase plates and a first polarizing plate stacked, in this order, on the outer surface of a first transparent substrate, third and fourth phase plates and a second polarizing plate stacked, in this order, on the outer surface of a second transparent substrate. The optical characteristics of the liquid crystal cell, the first to fourth phase plates, and the first and second polarizing plates are set within a predetermined range.

7 Claims, 9 Drawing Sheets

FIG. 3
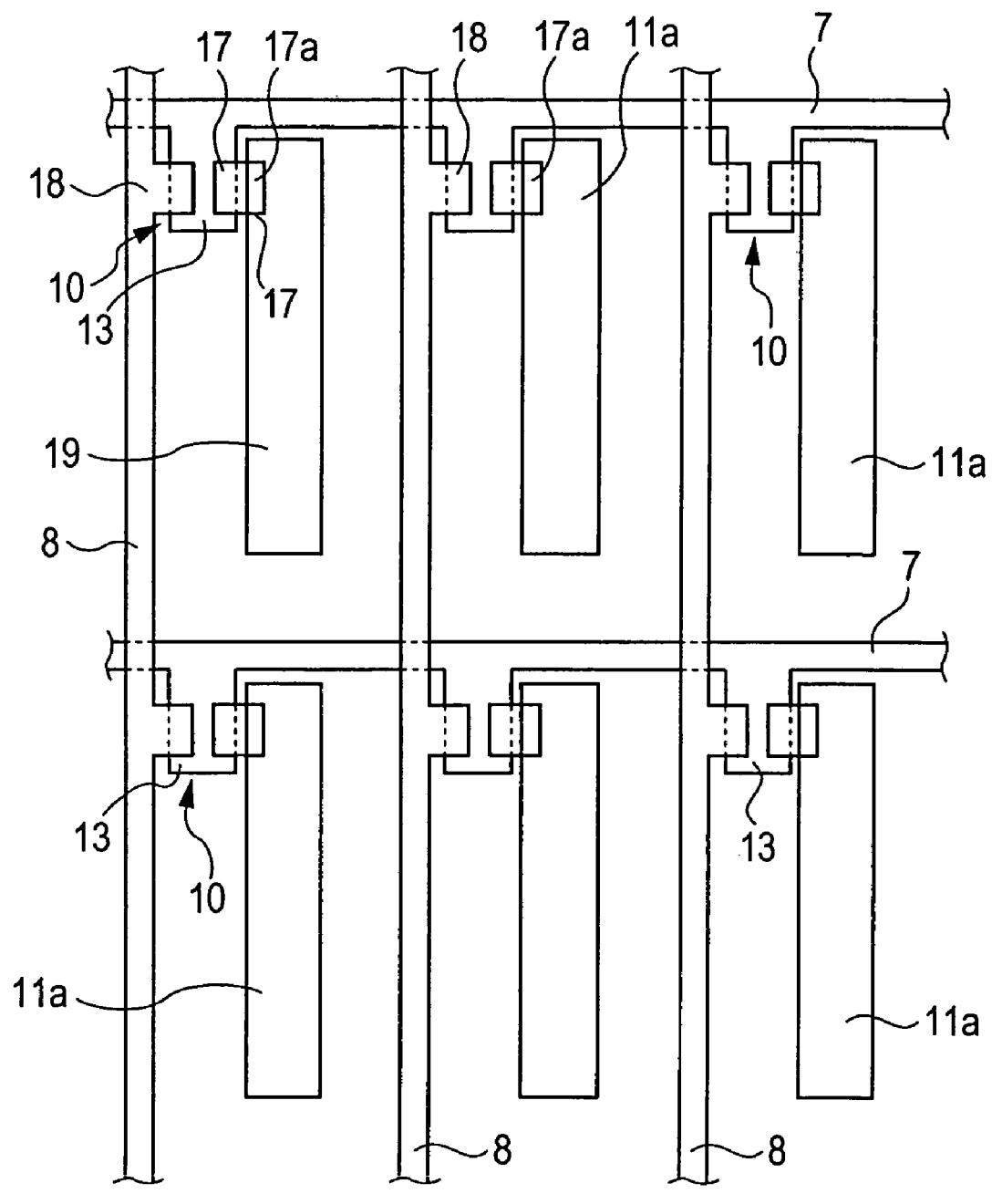
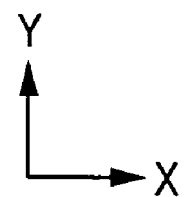

TRANSFLECTIVE LIQUID CRYSTAL DISPLAY DEVICE HAVING LIQUID CRYSTAL LAYER WITH MUCH LARGER TRANSMISSIVE RETARDATION THAN REFLECTIVE RETARDATION

BACKGROUND OF THE INVENTION

1. Field of the Invention

The present invention relates to a liquid crystal display apparatus and, more specifically, relates to a liquid crystal display apparatus including a reflective part and a transmissive part in a liquid crystal cell.

2. Description of the Related Art

In the field of display devices, active matrix display apparatuses that have high display quality are widely used. An active matrix display includes a plurality of pixel electrodes. Each of these pixel electrodes are provided with a switching element. In this way, each pixel electrode can be reliably switched. Consequently, a large-size display apparatus having high resolution can be provided.

Recently, there has been a need for display apparatuses that consume less power and have a brighter display with a larger pixel area. Accordingly, a display apparatus including an active matrix substrate that is entirely covered with a thick insulating layer and including reflective pixel electrodes disposed on this insulating layer has been put to practical use. For such a display apparatus that includes an insulating layer with pixel electrodes, electrical short-circuiting between scanning lines and signal lines provided below the insulating layer and the pixel electrodes on the insulating layer can be prevented. In this way, the pixel electrodes can be provided in a large area in a manner such that the pixel electrodes overlap the wiring. Consequently, most of the areas including the switching elements, such as thin film transistors (TFTs), the scanning lines, and the signal lines can be used as pixel areas that contribute to the display. Thus, the aperture ratio is increased, and the display becomes bright.

Since liquid crystal display apparatuses using only reflective pixel electrodes cannot be used in a dark area, semi-transmissive liquid crystal display apparatuses are put to wide use. A semi-transmissive liquid crystal display apparatus includes a backlight and has a structure that is the same as that of a reflective liquid crystal display apparatus capable of transmissive display in predetermined areas.

Lately, a liquid crystal display apparatus that is capable of operating in an optical compensated birefringence (OCB) mode has been drawing attention. In an OCB mode, gradation display is carried out by utilizing the facts that the liquid crystal molecules enter a bent state when a voltage is applied and the pretilt angle to the alignment direction gradually changes when the applied voltage is increased. In an OCB mode, response is fast and a large angle of visibility can be obtained.

Also, lately, as described in Japanese Unexamined Patent Application Publication No. 9-146086, a mode similar to an OCB mode has been proposed. In this mode similar to an OCB mode, liquid crystal molecules of a liquid crystal layer interposed between a pair of alignment films are in a hybrid state and one of the alignment films has a horizontal alignment whereas the other alignment film has a perpendicular alignment.

SUMMARY OF THE INVENTION

In a semi-transmissive liquid crystal display apparatus constituted of a reflective liquid crystal display apparatus that is capable of transmissive display in some areas, when the transmissive area is operated in an OCB mode and the reflective area is operated in a mode similar to the OCB mode, a liquid crystal display apparatus having fast response and high quality reflective and transmissive display functions can be realized. However, in such a display apparatus, two different areas having liquid crystal layers with different thicknesses and different operation modes exist in each pixel. As a result, the display contrast between the transmissive area and the reflective area in each pixel becomes great.

By taking into consideration the above-identified problems, an embodiment of the present invention provides a dual-gap type (multi-gap type) semi-transmissive liquid crystal display apparatus that has excellent display quality in both the transmissive and reflective areas by adjusting the optical characteristics of the transmissive and reflective areas and reducing the contrast between the transmissive and reflective areas.

To solve the above-identified problems, a liquid crystal display apparatus according to an embodiment of the present invention has the structure described below.

The liquid crystal display apparatus according to an embodiment of the present invention includes a liquid crystal cell including a liquid crystal layer interposed between a first transparent substrate and a second transparent substrate, wherein a common electrode and a first alignment film are stacked, in this order, on the inner side of the first transparent substrate, a plurality of switching elements and a plurality of pixel electrodes connected to the plurality of switching elements are disposed on the inner side of the second transparent substrate, and a second alignment film is disposed on the switching elements and the pixel electrodes, a second phase plate, a first phase plate, and a first polarizing plate stacked, in this order, on the outer side of the first transparent substrate, and a third phase plate, a fourth phase plate, and a second polarizing plate stacked, in this order, on the outer side of the second transparent substrate. The liquid crystal cell has a plurality of pixel areas corresponding to the pixel electrodes and the pixel electrodes in predetermined pixel areas are reflective, wherein the predetermined pixel areas constitute a reflective part configured to reflect incident light from the first transparent substrate and pixel areas excluding the predetermined pixel areas constitute a transmissive part configured to pass light from the second transparent substrate to the first transparent substrate. The liquid crystal cell, the first to fourth phase plates, and the first and second polarizing plates have four different combinations of optical characteristics described below.

As a first combination, a liquid crystal display apparatus according to an embodiment has the following optical characteristics:

axial direction of an absorption axis c of the first polarizing plate is within the range of $(\psi+15°)-30°$ to $(\psi+15°)+30°$;

retardation ($\Delta nd_{RF1}$) of the first phase plate is within the range of 250 to 290 nm;

axial direction of a retardation axis d of the first phase plate is within the range of $(\psi+30°)-15°$ to $(\psi+30°)+15°$;

retardation ($\Delta nd_{RF2}$) of the second phase plate is within the range of 160 to 200 nm;

axial direction of a retardation axis e of the second phase plate is within the range of $(\psi+90°)-15°$ to $(\psi+90°)+15°$;

retardation ($\Delta nd_{LT}$) of the transmissive part of the liquid crystal cell is within the range of 900 to 1,100 nm;

retardation ($\Delta nd_{LR}$) of the reflective part of the liquid crystal cell is within the range of 115 to 145 nm;

retardation ($\Delta nd_{RF3}$) of the third phase plate is within the range of 160 to 200 nm;

axial direction of a retardation axis f of the third phase plate is within the range of $(\psi+90°)-15°$ to $(\psi+90°)+15°$;

retardation ($\Delta nd_{RF4}$) of the fourth phase plate is within the range of 250 to 290 nm;

axial direction of a retardation axis g of the fourth phase plate is within the range of $(\psi+150°)-15°$ to $(\psi+150°)+15°$; and axial direction of an absorption axis h of the second polarizing plate is within the range of $(\psi+75°)-30°$ to $(\psi+75°)+30°$.

As a second combination, a liquid crystal display apparatus according to an embodiment has the following optical characteristics:

axial direction of an absorption axis c of the first polarizing plate is within the range of $(\psi+105°)-30°$ to $(\psi+105°)+30°$;

retardation ($\Delta nd_{RF1}$) of the first phase plate is within the range of 250 to 290 nm;

axial direction of a retardation axis d of the first phase plate is within the range of $(\psi+30°)-15°$ to $(\psi+30°)+15°$;

retardation ($\Delta nd_{RF2}$) of the second phase plate is within the range of 160 to 200 nm;

axial direction of a retardation axis e of the second phase plate is within the range of $(\psi+90°)-15°$ to $(\psi+90°)+15°$;

retardation ($\Delta nd_{LT}$) of the transmissive part of the liquid crystal cell is within the range of 900 to 1,100 nm;

retardation ($\Delta nd_{LR}$) of the reflective part of the liquid crystal cell is within the range of 115 to 145 nm;

retardation ($\Delta nd_{RF3}$) of the third phase plate is within the range of 160 to 200 nm;

axial direction of a retardation axis f of the third phase plate is within the range of $(\psi+90°)-15°$ to $(\psi+90°)+15°$;

retardation ($\Delta nd_{RF4}$) of the fourth phase plate is within the range of 250 to 290 nm;

axial direction of a retardation axis g of the fourth phase plate is within the range of $(\psi+150°)-15°$ to $(\psi+150°)+15°$; and axial direction of an absorption axis h of the second polarizing plate is within the range of $(\psi+165°)-30°$ to $(\psi+165°)+30°$.

As a third combination, a liquid crystal display apparatus according to an embodiment has the following optical characteristics:

axial direction of an absorption axis c of the first polarizing plate is within the range of $(\psi+165°)-30°$ to $(\psi+165°)+30°$;

retardation ($\Delta nd_{RF1}$) of the first phase plate is within the range of 250 to 290 nm;

axial direction of a retardation axis d of the first phase plate is within the range of $(\psi+150°)-15°$ to $(\psi+150°)+15°$;

retardation ($\Delta nd_{RF2}$) of the second phase plate is within the range of 160 to 200 nm;

axial direction of a retardation axis e of the second phase plate is within the range of $(\psi+90°)-15°$ to $(\psi+90°)+15°$;

retardation ($\Delta nd_{LT}$) of the transmissive part of the liquid crystal cell is within the range of 900 to 1,100 nm;

retardation ($\Delta nd_{LR}$) of the reflective part of the liquid crystal cell is within the range of 115 to 145 nm;

retardation ($\Delta nd_{RF3}$) of the third phase plate is within the range of 160 to 200 nm;

axial direction of a retardation axis f of the third phase plate is within the range of $(\psi+90°)-15°$ to $(\psi+90°)+15°$;

retardation ($\Delta nd_{RF4}$) of the fourth phase plate is within the range of 250 to 290 nm;

axial direction of a retardation axis g of the fourth phase plate is within the range of $(\psi+30°)-15°$ to $(\psi+30°)+15°$; and axial direction of an absorption axis h of the second polarizing plate is within the range of $(\psi+105°)-30°$ to $(\psi+105°)+30°$.

As a fourth combination, a liquid crystal display apparatus according to an embodiment has the following optical characteristics:

axial direction of an absorption axis c of the first polarizing plate is within the range of $(\psi+75°)-30°$ to $(\psi+75°)+30°$;

retardation ($\Delta nd_{RF1}$) of the first phase plate is within the range of 250 to 290 nm;

axial direction of a retardation axis d of the first phase plate is within the range of $(\psi+150°)-15°$ to $(\psi+150°)+15°$;

retardation ($\Delta nd_{RF2}$) of the second phase plate is within the range of 160 to 200 nm;

axial direction of a retardation axis e of the second phase plate is within the range of $(\psi+90°)-15°$ to $(\psi+90°)+15°$;

retardation ($\Delta nd_{LT}$) of the transmissive part of the liquid crystal cell is within the range of 900 to 1,100 nm;

retardation ($\Delta nd_{LR}$) of the reflective part of the liquid crystal cell is within the range of 115 to 145 nm;

retardation ($\Delta nd_{RF3}$) of the third phase plate is within the range of 160 to 200 nm;

axial direction of a retardation axis f of the third phase plate is within the range of $(\psi+90°)-15°$ to $(\psi+90°)+15°$;

retardation ($\Delta nd_{RF4}$) of the fourth phase plate is within the range of 250 to 290 nm;

the axial direction of a retardation axis g of the fourth phase plate is within the range of $(\psi+30°)-15°$ to $(\psi+30°)+15°$; and the axial direction of an absorption axis h of the second polarizing plate is within the range of $(\psi+15°)-30°$ to $(\psi+15°)+30°$.

The axial direction ($\psi+N°$) (N representing an integer) represents an angle N to an alignment direction $\psi$ of the liquid crystal, ($\psi+N°$) represents the angle $N°$ to the alignment direction $\psi$ in the counterclockwise direction with respect to the first substrate, and ($\psi-N°$) represents the angle $N°$ to the alignment direction $\psi$ in the clockwise direction with respect to the first substrate.

According to the above-described structure, in the liquid crystal display apparatus operating in an OCB mode or a mode similar to OCB mode, the display in the transmissive part and the reflective part can be made even and unevenness in display can be prevented. In particular, unevenness in the contrast can be prevented.

In the above-described liquid crystal display apparatus according to an embodiment of the present invention, the transmissive part operates in a mode in which the alignments of the first and second alignment films in the transmissive part have horizontal alignments and the liquid crystal molecules included the liquid crystal layer are in a bent alignment when a voltage is applied, and the reflective part operates in a mode in which the one of the first and second alignment films in the reflective part has a perpendicular alignment, the other alignment film has a horizontal alignment, and the liquid crystal molecules included the liquid crystal layer are in a hybrid alignment when a voltage is applied.

According to the above-described structure, the transmissive part operates in an OCB mode and the reflective part operates in a mode similar to an OCB mode. Therefore, a liquid crystal display apparatus capable of fast response can be provided.

In the above-described liquid crystal display apparatus according to an embodiment of the present invention, the thickness of the liquid crystal layer in the transmissive part is twice the thickness of the liquid crystal layer in the reflective part.

According to the above-described structure, the liquid crystal molecules in the transmissive part are aligned in an arch pattern and the liquid crystal molecules in the reflective part are aligned in a semi-arch pattern. The length of the light path of the light passing through the liquid crystal layer in the reflective part can be matched with the length of the light path of the light passing through the liquid crystal layer in the transmissive part.

In the liquid crystal display apparatus according to an embodiment of the present invention, it is preferable that the pixel electrodes in the reflective part are reflective pixel electrodes composed of a metal film and the pixel electrodes in the transmissive part are transparent pixel electrodes composed of a transparent conductive film.

In the liquid crystal display apparatus according to an embodiment of the present invention, it is preferable that a color filter is interposed between the first transparent substrate and the common electrode and the color filter in the reflective part is thinner than the color filter in the transmissive part. According to an embodiment of the present invention, it is preferable that the thickness of the color filter in the reflective part is one-half of the thickness of the color filter in the transmissive part.

Light from the front side of the liquid crystal cell passes through the color filter in the reflective part, and, then, this incident light is reflected at the reflective body and passes through the color filter again as reflected light. In this way, light passes through the color filter in the reflective part twice, whereas light from the backlight passes through the color filter in the transmissive part only once. Therefore, if the color filters in the reflective part and the transmissive part have a uniform thickness, luminance is reduced in the reflective part and colors in the transmissive part and the reflective part become uneven.

Accordingly, in the present invention, the above-described structure is employed so as to prevent the generation of unevenness in color in the transmissive part and the reflective part to make the contrast and luminance constant.

By setting the thickness of the color filter in the reflective part one-half of the thickness of the color filter in the transmissive part, unevenness in color can be completely prevented.

In the liquid crystal display apparatus according to an embodiment of the present invention, a transparent resin film is stacked on the color filter on the side facing the liquid crystal layer in the reflective part and the total thickness of the color filter and the transparent resin layer in the reflective part is the same as the thickness of the color filter in the transmissive part.

According to the above-described structure, the transparent resin film in the reflective part and the color filter in the transmissive part are flush with each other. Therefore, the cell gap in the liquid crystal cell can be easily controlled.

In the liquid crystal display apparatus according to an embodiment of the present invention, a sidewall of the reflective part is formed adjacent to the periphery of the transmissive part and the angle of inclination of the sidewall is within the range of 25° to 55°.

According to the above-described structure, light can be reflected at the sidewall and the border between the transmissive part and the reflective part stands out. In this way, unevenness in the display can be prevented.

According to an embodiment of the present invention, a liquid crystal display apparatus having uniform luminance and even colors can be provided by optimizing the optical characteristics of the liquid crystal cell, the polarizing plates, and the phase plates.

BRIEF DESCRIPTION OF THE DRAWINGS

FIG. 3 is a plan view of an example of the arrangement of TFTs and pixel electrodes of the liquid crystal cell;

DESCRIPTION OF THE PREFERRED EMBODIMENTS

Figure 1:
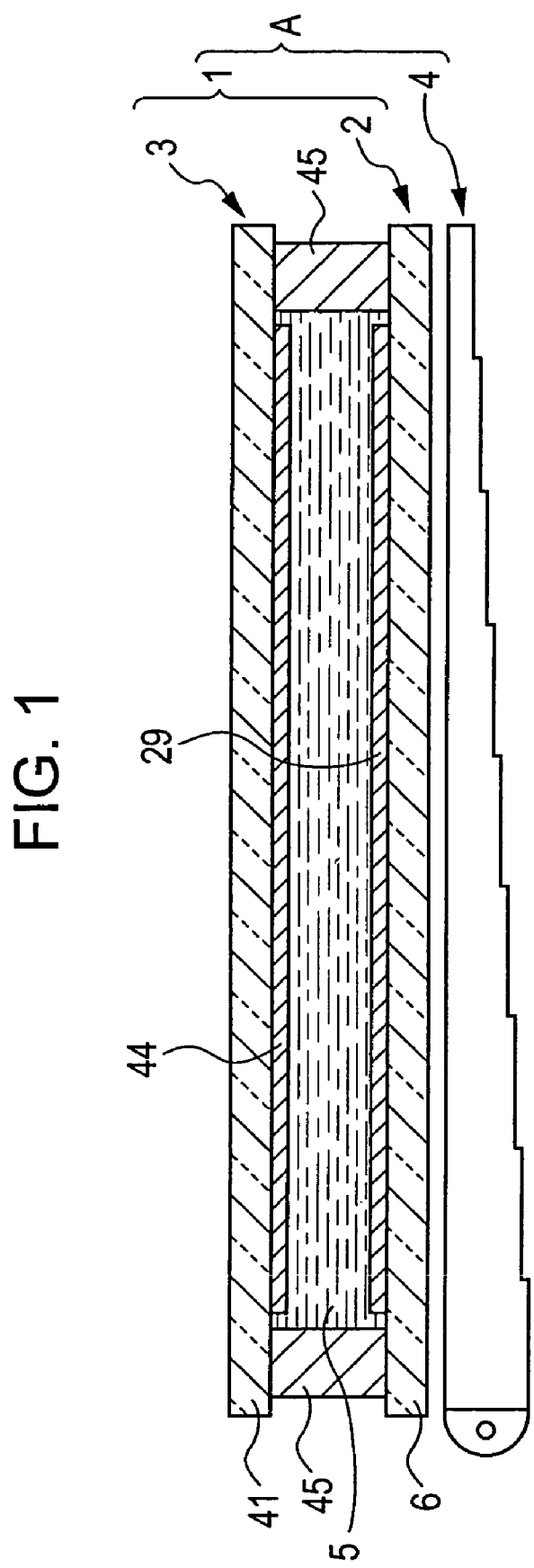
FIG. 1 is a cross-sectional view of a liquid crystal display apparatus according to an embodiment of the present invention.

A liquid crystal display apparatus according to an embodiment of the present invention will be described below with reference to the drawings. The proportions of the thicknesses and the sizes of the components illustrated in the drawings are changed so that the drawings are easily viewable.

FIGS. 1 to 9 illustrate a semi-transmissive liquid crystal display apparatus according to an embodiment of the present invention. A semi-transmissive liquid crystal display apparatus A according to an embodiment of the present invention is operated in an OCB mode. As shown in FIG. 1, the semi-transmissive liquid crystal display apparatus A includes a liquid crystal cell (liquid crystal panel) 1 that is the body of the semi-transmissive liquid crystal display apparatus A and a backlight 4 disposed behind the liquid crystal panel 1.

Figure 2:
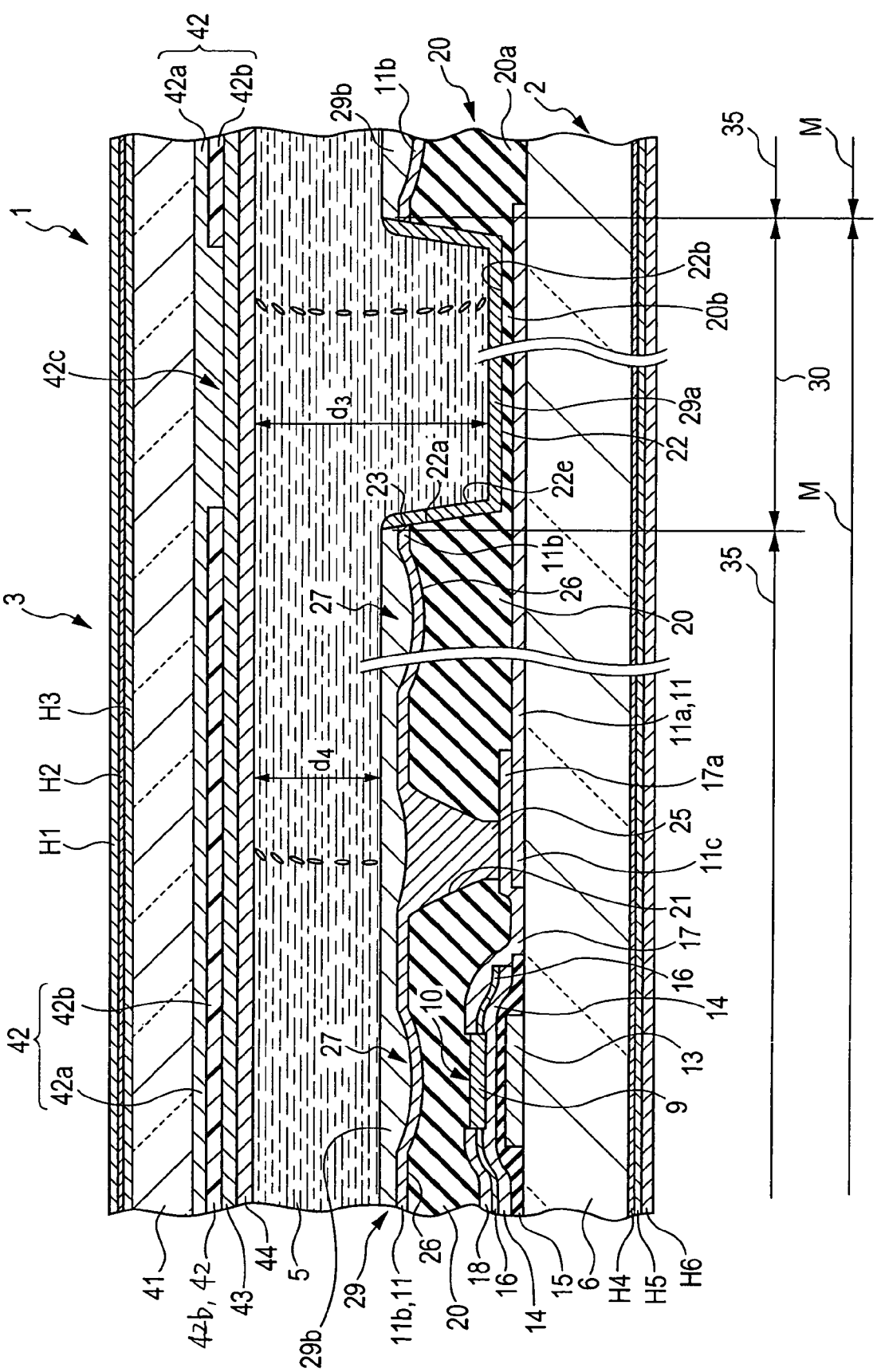
FIG. 2 is a cross-sectional view of a liquid crystal cell included in the liquid crystal display apparatus according to an embodiment of the present invention.

As shown in FIGS. 1 and 2, the liquid crystal cell (liquid crystal panel) 1 includes an active matrix substrate 2 provided on the same side as switching elements 10, an opposing substrate 3 provided opposite to the active matrix substrate 2, and a liquid crystal layer 5 that is interposed between the substrates 2 and 3 and functions as a light-modulating layer.

The opposing substrate 3 is constituted of a color filter 42, a common electrode 43, and an alignment film 44 stacked, in this order, on the inner side (i.e., the side of the liquid crystal layer 5) of a substrate (first transparent substrate) 41. The active matrix substrate 2 includes a substrate (second transparent substrate) 6, the switching elements 10 provided on the substrate 6, a pixel electrode 11 connected to the switching elements 10, a reflective body 20, and an alignment film 29 stacked on the pixel electrode 11. The liquid crystal layer 5 is interposed between the alignment film 29 and the alignment film 44.

The pixel electrode 11 includes a transmissive pixel electrode 11a stacked on the substrate 6 and a reflective pixel electrode 11b including an insulating film 20a and the reflective body 20. The transmissive pixel electrode 11a and the reflective pixel electrode 11b are connected to the switching elements 10.

On the outer surface of the opposing substrate 3, a second phase plate H3 (i.e., a phase plate adjacent to the opposing substrate 3), a first phase plate H2 (i.e., a phase plate adjacent to a first polarizing plate), and a first polarizing plate H1 are stacked in this order. On the outer surface of the active matrix substrate 2, a third phase plate H4, a fourth phase plate H5, and a second polarizing plate H6 are stacked in this order. The backlight 4 is disposed below the second polarizing plate H6.

The semi-transmissive liquid crystal display apparatus A is operated in a reflective mode in which the backlight 4 is not illuminated when sufficient outside light is available and is operated in a transmissive mode in which the backlight 4 is illuminated when sufficient outside light is not available.

The liquid crystal display apparatus according to this embodiment of the present invention operates in a reflective OCB (R-OCB) mode when in a reflective mode and operates in an OCB mode when in a transmissive mode.

In the reflective mode, light incident on the first polarizing plate H1 is linearly polarized. The linearly polarized light is elliptically polarized as it passes through the first phase plate H2, the second phase plate H3, and the liquid crystal layer 5. The elliptically polarized light is reflected at the reflective body 20 and passes through the liquid crystal layer 5, the second phase plate H3, and the first phase plate H2, in this order. Finally, the light reaches the first polarizing plate H1 again and is emitted as a linearly polarized light.

In the transmissive mode, the light emitted from the backlight 4 is linearly polarized at the second polarizing plate H6. The linearly polarized light is elliptically polarized as it passes through the fourth phase plate H5, the third phase plate H4, the liquid crystal layer 5, the second phase plate H3, and the first phase plate H2, in this order. The elliptically polarized light is linearly polarized as it passes through the first polarizing plate H1. Accordingly, linearly polarized light is emitted from the first polarizing plate H1.

Figure 4:
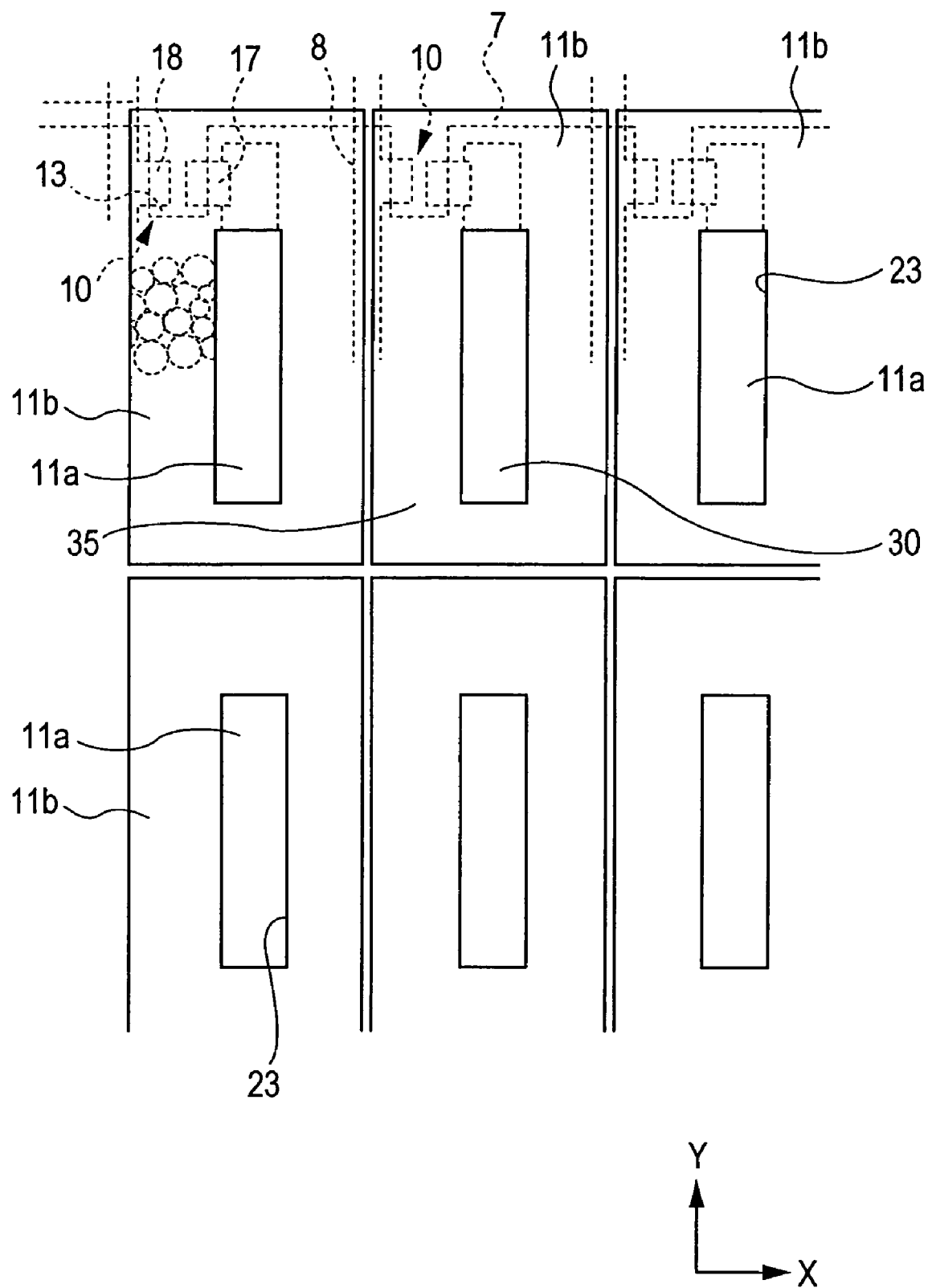
FIG. 4 is a plan view of an example the arrangement of pixel electrodes of the liquid crystal cell.

As shown in FIGS. 2, 3, and 4, on the substrate 6 of the active matrix substrate 2, a plurality of scanning lines 7 disposed along the row direction (i.e., x direction in FIGS. 3 and 4) and a plurality of signal lines 8 disposed along the column direction (i.e., y direction in FIGS. 3 and 4) are electrically insulated. TFTs (switching elements 10) are provided at each of the intersections of the scanning lines 7 and the signal lines 8. According to this embodiment, the areas on the substrate 6 where the pixel electrodes 11 (11a and 11b) are provided are defined as pixel areas M, the areas where the TFTs (switching elements 10) are provided are defined as element areas, and the areas where the scanning lines 7 and the signal lines 8 are provided are defined as wiring areas.

The TFTs (switching elements 10) have an inverse staggered structure. On the substrate 6, a gate electrode 13, a gate insulating film 15, an intrinsic semiconductor (i-type semiconductor) layer 14, a source electrode 17, and a drain electrode 18 are stacked in order. An etching stopper layer 9 is disposed on the i-type semiconductor layer 14 and interposed between the source electrode 17 and the drain electrode 18.

More specifically, the gate electrode 13 is formed by extending part of the scanning line 7 and an island of the i-type semiconductor layer 14 is provided on the gate insulating film 15 in a manner such that the gate electrode 13 is covered when viewed from the top. Moreover, the source electrode 17 is connected to a first end of the i-type semiconductor layer 14 via an n-type semiconductor layer 16, and the drain electrode 18 is connected to a second end of the i-type semiconductor layer 14 via the n-type semiconductor layer 16.

One of the transmissive pixel electrodes 11a (pixel electrodes 11) composed of a transparent electrode material, such as indium tin oxide (ITO), is provided in each rectangular area defined by the scanning lines 7 and the signal lines 8 in a manner such that the transmissive pixel electrode 11a is directly disposed on the substrate 6. In other words, the transmissive pixel electrode 11a is provided on the same plane as the gate electrode 13. The transmissive pixel electrode 11a, having a rectangular shape when viewed from the top, is directly connected to a connection part 17a provided at one end of the source electrode 17, which overlaps with one end 11c of the transmissive pixel electrode 11a. As shown in FIG. 3, the length of the transmissive pixel electrode 11a is slightly shorter than the longitudinal length of a rectangular area defined by the scanning lines 7 and the signal lines 8, and the width of the transmissive pixel electrode 11a is a fraction of the width of the rectangular area.

The substrate 6 is composed of a transparent insulating substrate, such as synthetic resin. As shown in FIG. 3, the gate electrodes 13 are composed of a conductive metal material and are provided as single units with the scanning lines 7 disposed along the row direction. The gate insulating films 15 are composed of a silicon-based insulating film, such as silicon oxide ($SiO_x$) or silicon nitrate ($SiN_y$), and are provided on the substrate in a manner such that the scanning lines 7 and the gate electrodes 13 are covered but the transmissive pixel electrodes 11a are not covered. The gate insulating films 15 must be provided in areas at least excluding the connecting parts of the transmissive pixel electrodes 11a and the source electrodes 17. Therefore, the gate insulating films 15 are not provided on the transmissive pixel electrodes 11a. However, the gate insulating films 15 may be provided on the transmissive pixel electrodes 11a so long as the connecting parts of the transmissive pixel electrodes 11a and the source electrodes 17 are not covered by the gate insulating films 15.

The i-type semiconductor layers 14 are composed of amorphous silicon (a-Si). The areas of the i-type semiconductor layers 14 that oppose the gate electrodes 13 across the gate insulating films 15 are defined as a channel area. The source electrodes 17 and the drain electrodes 18 are composed of a conductive material and are disposed opposite to each other in a manner such that the i-type semiconductor layers 14 are interposed between the electrodes 17 and 18. The drain electrodes 18 are formed by extending of the signal lines 8 disposed along the column direction.

To establish a sufficient ohmic contact between the i-type semiconductor layers 14 and the electrodes 17 and 18, the n-type semiconductor layers 16 are interposed between the i-type semiconductor layers 14 and the electrodes 17 and 18. The n-type semiconductor layers 16 are doped by a high concentration of a V-group element, such as phosphorous (P).

Moreover, the insulating film 20a composed of an organic material is stacked on the substrate 6. On the insulating film 20a, the reflective pixel electrodes 11b (pixel electrodes 11) composed of a metal material having a high reflective rate, such as aluminum (Al) or silver (Ag), are provided. The insulating film 20a and the reflective pixel electrodes 11b constitute the reflective body 20.

The reflective pixel electrodes 11b are provided on the insulating film 20a so that the size of the reflective pixel electrodes 11b is slightly smaller than the rectangular areas defined by the scanning lines 7 and the signal lines 8, when viewed from the top. As shown in FIG. 4, when viewed from the top, the reflective pixel electrodes 11b are arranged in a matrix so that predetermined gaps are provided between the reflective pixel electrodes 11b in so as to prevent short-circuiting. More specifically, the reflective pixel electrodes 11b are disposed so that their sides are parallel to the scanning lines 7 and the signal lines 8 disposed below the reflective pixel electrodes 11b. In this way, most of the areas defined by the scanning lines 7 and the signal lines 8 function as pixel areas. The pixel areas are equivalent to the display areas of the liquid crystal cell (liquid crystal panel) 1.

The insulating film 20a is composed of an organic insulating film, such as acrylic resin, polyimide resin, or benzocyclo-butene (BCB) polymer, and reinforces the protection by the switching elements (TFTs) 10. A relatively thick insulating film 20a is stacked on the substrate 6 so as to provide reliable insulation between the transmissive pixel electrodes 11a, the switching elements (TFTs) 10, and the various wirings and so as to prevent the generation of a large parasitic capacitance. At the same time, the thick insulating film 20a flattens the surface of the substrate 6 on which the switching elements (TFTs) 10 and the various wirings are provided.

Next, in the insulating film 20a, contact holes 21 that reach ends 17a of the source electrodes 17 are formed and depressions 22 are formed above the transmissive pixel electrodes 11a. A through-hole 23 matching an opening 22a of each of the depressions 22, when viewed from the top, is formed in each of the reflective pixel electrodes 11b, in an area corresponding to the depression 22. The depression 22 is formed by removing most of the insulating film 20a in the area corresponding to the depression 22 in the depth direction so that a coating layer 20b remains at the bottom part 22b. The depression 22 is shaped as a rectangle having slightly shorter length than the length of the transmissive pixel electrode 11a so that the depression 22 and the transmissive pixel electrodes 11a correspond to each other when viewed from the top.

In each pixel area, the area where the depression 22 is provided is defined as a transmissive part 30 capable of transmitting light incident from the active matrix substrate 2 (i.e., light emitted from the backlight 4), whereas the area in each of the reflective pixel electrodes 11b where light is not transmitted (i.e., the area where the through-hole 23 is not formed) is defined as a reflective part 35 capable of reflecting incident light from the opposing substrate 3.

Since one pixel electrode 11 (11a or 11b) substantially corresponds to one pixel area and the area of the through-hole 23 corresponds to the light-passing area while in a transmissive display mode, the proportion of the area of the through-hole 23 to the entire area of the pixel electrode 11 should preferably be 20% to 60%, e.g., 40%. According to this embodiment, only one through-hole 23 is formed in each pixel electrode 11. However, a plurality of through-holes may be formed in each pixel electrode 11. In such a case, the total area of the plurality of through-holes should be 20% to 60% of the total area of the pixel electrode 11. In such a case, depressions are provided below the through-holes at positions corresponding to the through-holes.

Conductive parts 25 composed of conductive material are provided at the contact holes 21 formed in the insulating film 20a. The reflective pixel electrodes 11b and the source electrodes 17 disposed at the lower layer of the insulating film 20a are electrically connected via the conductive parts 25. Hence, the source electrodes 17 are electrically connected to both the transmissive pixel electrodes 11a and the reflective pixel electrodes 11b.

On the substrate 6 having the above-described structure, the alignment film 29 is provided on the lower substrate in a manner such that the alignment film 29 covers the reflective body 20 and the depression 22. The alignment film 29 is composed of polyimide, and a predetermined alignment processing, such as rubbing, is carried out on the alignment film 29. A different alignment processing is carried out on the transmissive part 30 of the alignment film 29 and the reflective part 35 of the alignment film 29. In other words, the alignment film 29 includes a transmissive alignment film 29a provided on the side of the liquid crystal layer of the transmissive part 30 and a reflective alignment film 29b provided on the side of the liquid crystal layer of the reflective part 35.

The depression 22 formed in the insulating film 20a includes a sidewall 22e extending in the thickness direction of the insulating film 20a. According to this embodiment, the angle of inclination of the sidewall 22e is 25° or more and 55° or less. According to this structure, light is reflected at the sidewall 22e. In this way, the border between the transmissive part 30 and the reflective part 35 does not stands out, and, thus, unevenness in the display can be prevented. It is not preferable to set the angle of inclination smaller than 25° since the projection along the normal line of the inclined portion will be long and the effective display area will be reduced. It is also not preferable to set the angle of inclination greater than 55° since the alignment will be significantly distorted due to the unevenness of the surface. The most preferable angle of inclination for the sidewall 22e is 40°.

In particular, it is preferable that the angle of inclination of the sidewall 22e equals the pretilt angle of the liquid crystal molecules on the transmissive alignment film 29a. In this way, the border between the transmissive part 30 and the reflective part 35 does not stand out, and unevenness in the display can be prevented.

As shown in FIG. 2, the opposing substrate 3 includes the color filter 42 on the transparent substrate 41, which is composed of glass or plastic, on the side of the liquid crystal layer 5.

Figure 5:
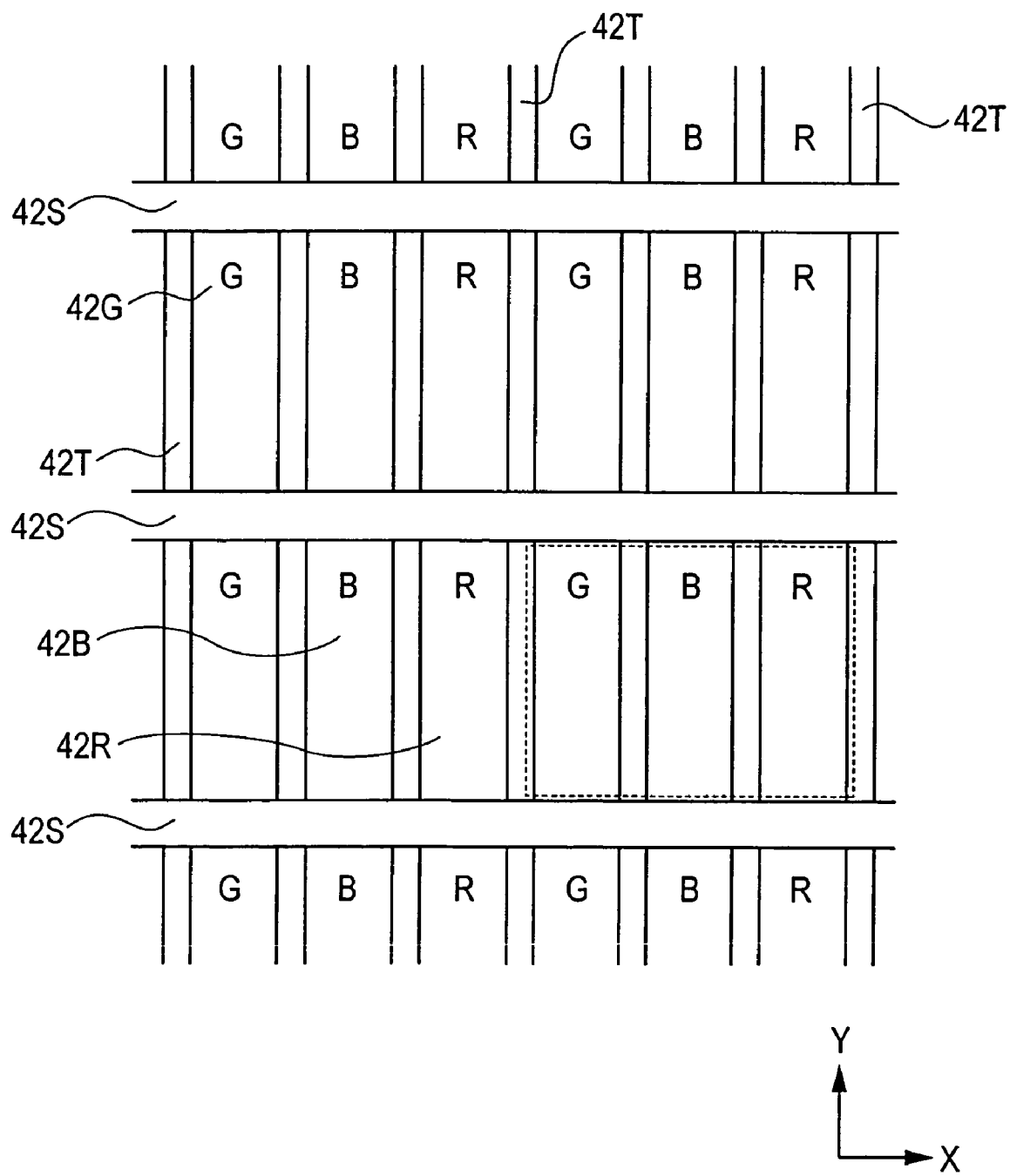
FIG. 5 is a schematic view of an example of a color filter included in the liquid crystal cell.

In the color filter 42, as shown in FIG. 5, color filters 42R, 42G, and 42B that transmit light beams having wavelengths corresponding to red (R), green (G), and blue (B), respectively, are arranged in a periodic pattern. The color filters 42R, 42G, and 42B oppose the pixel electrodes 11 (11a and 11b). In areas of the color filter 42 where the color filters 42R, 42G, and 42B are not provided, light-blocking layers 42S and 42T, such as a black matrix, are provided as a grid.

The color filter 42 includes a reflective color filter 42a disposed on the reflective part 35, a transparent resin layer 42b stacked on the reflective color filter 42a, and a transparent color filter 42c provided as a single unit with the reflective color filter 42a disposed on the transmissive part 30. The thickness of the reflective color filter 42a is one-half of the thickness of the transparent color filter 42c. The total thickness of the reflective color filter 42a and the transparent resin layer 42b is substantially the same as the thickness of the transparent color filter 42c. In this way, the surface of the color filter 42 on the side of the liquid crystal layer 5 is substantially flat.

On the liquid crystal layer side of the above-described color filter 42, the common electrode (transparent opposing electrode) 43, composed of ITO, and the alignment film 44 for the upper substrate are provided. The alignment film 44 is composed of polyimide, and a predetermined alignment processing, such as rubbing, is carried out on the alignment film 44. A different alignment processing is carried out on the transmissive part 30 of the alignment film 44 and the reflective part 35 of the alignment film 44.

The substrates 2 and 3 having the above-described structures are held at a predetermined distance apart from each other by spacers (not shown in the drawings) and are bonded together, as shown in FIG. 1, with a thermosetting sealing material 45 applied in a rectangular shape to the peripheral areas of the substrates. To constitute the liquid crystal cell 1, the liquid crystal layer 5 that is a light-modulating layer is formed by containing liquid crystal in the sealed space formed by the substrates 2 and 3 and the sealing material 45.

The semi-transmissive liquid crystal display apparatus A according to this embodiment includes the insulating film 20a having the depressions 22, as described above. By introducing liquid crystal into the depressions 22, the thickness $d_3$ of the liquid crystal layer 5 at the transmissive parts 30 is twice the thickness $d_4$ of the liquid crystal layer 5 at the reflective parts 35. In other words, the total thickness of the thickness of the reflective body 20 and the thickness $d_4$ of the liquid crystal layer 5 at the reflective parts 35 equal the thickness $d_3$ of the liquid crystal layer 5 at the transmissive parts 30. Moreover, the thickness of the reflective body 20 equals the thickness $d_4$ of the liquid crystal layer 5 at the reflective parts 35.

Next, the optical characteristics of the semi-transmissive liquid crystal display apparatus A according to this embodiment will be described.

First, the optical characteristics of the liquid crystal cell 1 will be described.

The liquid crystal layer 5 is constituted of liquid crystal molecules that are in a nematic state at normal temperature.

As shown in FIG. 2, when a reference voltage (i.e., a voltage that generates a white display) is applied to the liquid crystal layer 5 at the transmissive part 30, the liquid crystal molecules on the alignment film 44 and in the vicinity of the transmissive alignment film 29a are in a horizontal alignment (with a pretilt of 3° to 8°) and the liquid crystal molecules in the central area of the liquid crystal layer 5 are in a perpendicular alignment. In other words, as a whole, the liquid crystal molecules are in a bent alignment in which the molecules are aligned in an arch pattern. When the voltage is gradually increased from the reference voltage, the pretilt angle of the liquid crystal molecules on the alignment film 44 and in the vicinity of the transmissive alignment film 29a is gradually increased in accordance with the applied voltage. In this way, hierarchical display is possible. As described above, the transmissive parts 30 of the liquid crystal display apparatus according to this embodiment operates in an OCB mode.

As shown in FIG. 2, when the reference voltage (i.e., a voltage that generates a white display) is applied to the liquid crystal layer 5 at the reflective part 35, the liquid crystal molecules on the alignment film 44 are in a horizontal alignment (with a pretilt of 3° to 8°), the liquid crystal molecules in the vicinity of the reflective alignment film 29b are in a perpendicular alignment (with a pretilt of 88° to 90°), and the liquid crystal molecules in the central area of the liquid crystal layer 5 are in a perpendicular alignment. In other words, as a whole, the liquid crystal molecules are in a hybrid alignment in which the molecules are aligned in an arch pattern. When the voltage is gradually increased from reference voltage, the pretilt angle of the liquid crystal molecules on the alignment film 44 is gradually increased in accordance with the applied voltage. In this way, hierarchical display is possible. As described above, the reflective part 35 of the liquid crystal display apparatus according to this embodiment operates in a mode similar to an OCB mode (i.e., R-OCB mode).

The alignment direction of the liquid crystal molecules included in the liquid crystal layer 5 viewed from the side of the opposing substrate 3 is determined by the alignment direction of the alignment film 44. The alignment directions of the reflective part 35 and the transmissive part 30 are the same.

For the liquid crystal constituting the liquid crystal layer 5, it is preferable that the wavelength dispersion of the double refraction $\Delta n_{LC}$ of the liquid crystal is smaller than the wavelength dispersion of the double refraction $\Delta n_{RF1}$ of the first phase plate H2, the wavelength dispersion of the double refraction $\Delta n_{RF2}$ of the second phase plate H3, wavelength dispersion of the double refraction $\Delta n_{RF3}$ of the third phase plate H4, and the wavelength dispersion of the double refraction $\Delta n_{RF5}$ of the fourth phase plate H5 since a higher contrast and an excellent display characteristics can be achieved. The wavelength dispersion of the double refraction $\Delta n_{LC}$ of the liquid crystal in the liquid crystal layer 5 can be changed by changing the liquid crystal material. The double refractions $\Delta n_{RF1}$, $\Delta n_{RF2}$, $\Delta n_{RF3}$, and $\Delta n_{RF4}$ can be changed by changing the materials used for the phase plates.

Figure 6:
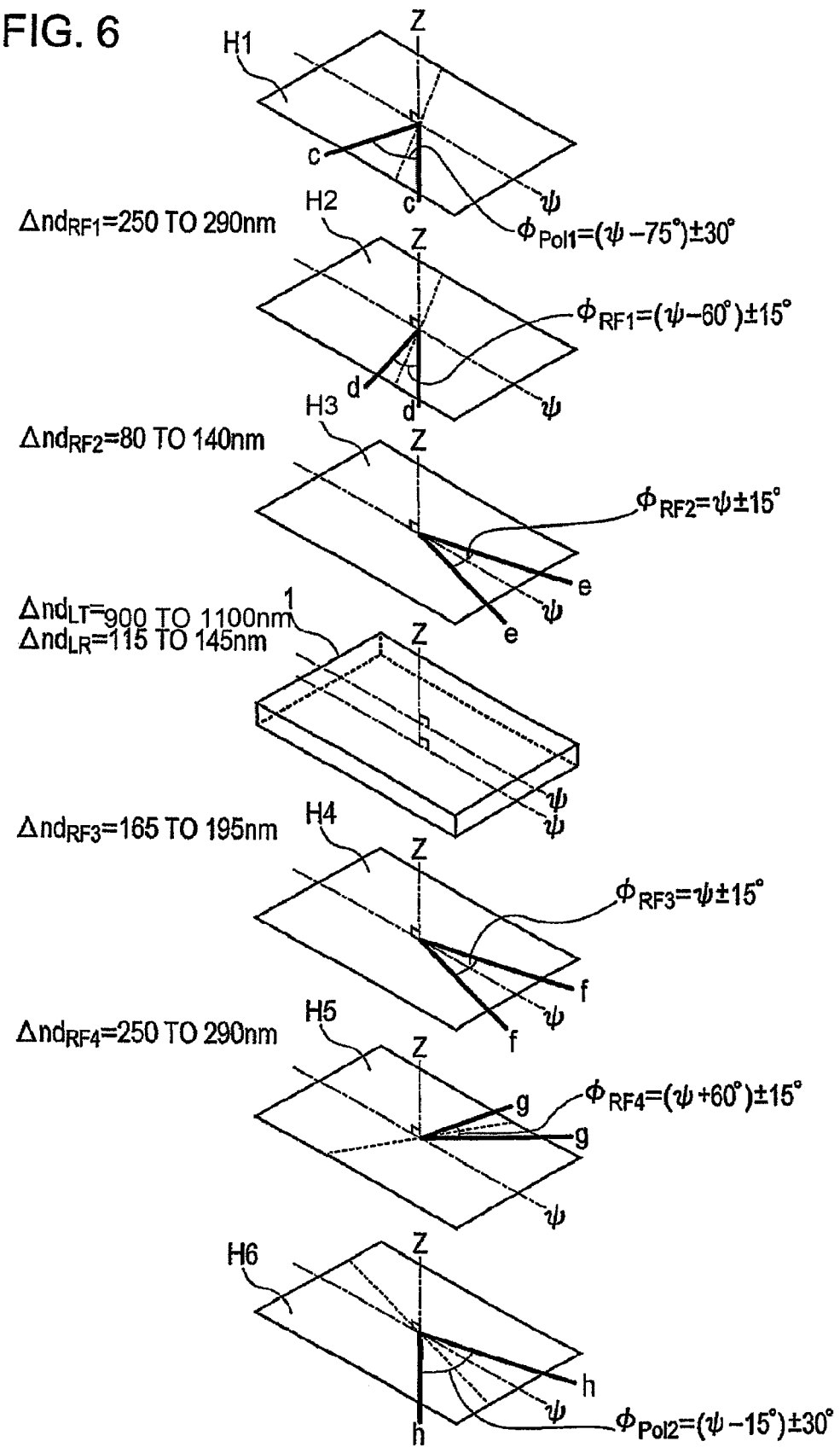
FIG. 6 illustrates the main part of the liquid crystal display apparatus according to an embodiment of the present invention and is an exploded perspective view of a first combination of optimal optical characteristics.
Figure 7:
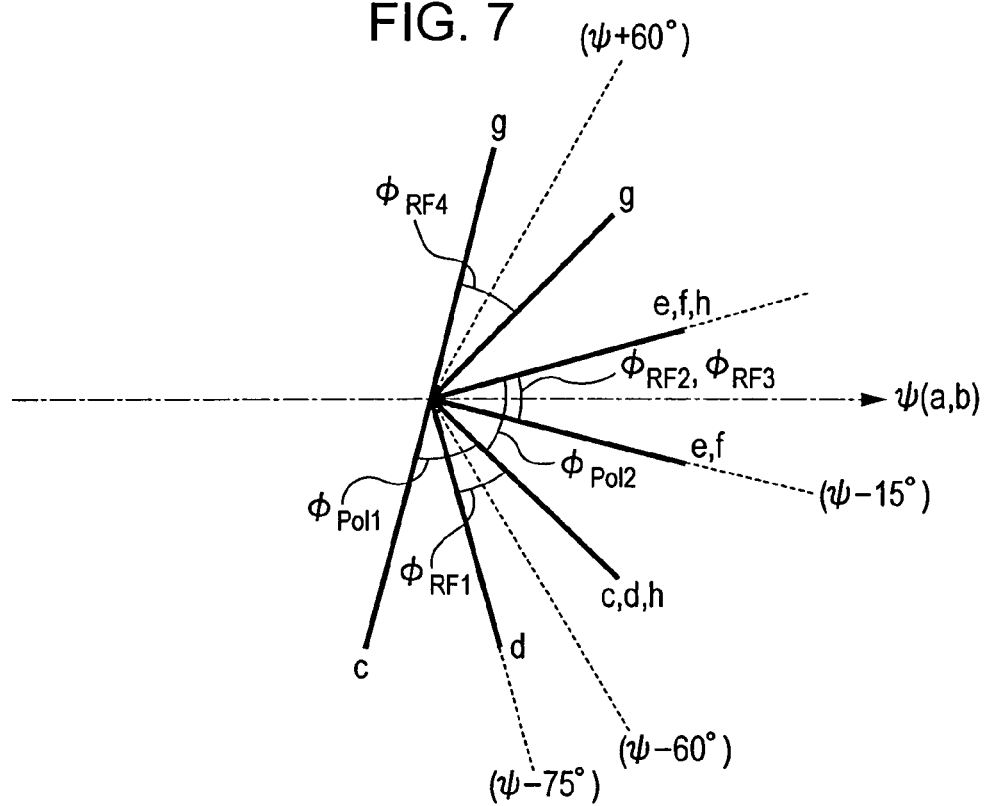
FIG. 7 is a plan view of the arrangements of a first combination of an absorption axis c of a first polarizing plate, a retardation axis d of a second phase plate, a retardation axis e of a first phase plate, an alignment direction a of a upper alignment film, an alignment direction b of a lower alignment film, a retardation axis f of a third phase plate, a retardation axis g of a fourth phase plate, and an absorption axis h of a second polarizing plate of a liquid crystal display apparatus according to an embodiment of the present invention.

As shown in FIGS. 6 and 7, it is preferable to set the alignment direction (rubbing direction) a of the alignment film 44 of the transmissive part 30 and the reflective part 35 and the alignment direction (rubbing direction) b of the transmissive alignment film 29a of the transmissive part 30 parallel to each other so that the direction corresponds to the alignment direction of the liquid crystal molecules. It is preferable that the alignment direction of the reflective alignment film 29b of the reflective part 35 is the perpendicular direction. As shown in FIGS. 6 and 7, the alignment directions a and b are the same as the alignment direction ψ of the liquid crystal. In FIGS. 6 and 7, the Z axis is orthogonal to the incident plane of light entering the liquid crystal cell 1, the phase plates H2, H3, H4, and H5, and the polarizing plates H1 and H6.

The value of retardation $\Delta nd_{LT}$ that is obtained by multiplying the double refraction $\Delta n_{LT}$ of the transmissive part 30 of the liquid crystal cell 1 and the thickness d ($d_3$) of the liquid crystal layer 5 is within the range of 900 to 1,100 nm (wherein the measured wavelength is 589 nm). When the retardation $\Delta nd_{LT}$ is not within this range, it is not preferable because the white display is darkened or becomes yellow.

The value of retardation $\Delta nd_{LR}$ that is obtained by multiplying the double refraction $\Delta n_{LT}$ of the reflective part 35 of the liquid crystal cell 1 and the thickness d ($d_4$) of the liquid crystal layer 5 is within the range of 115 to 145 nm (wherein the measured wavelength is 589 nm). When the retardation $\Delta nd_{LR}$ is not within this range, it is not preferable because the white display is darkened or the contrast is reduced.

Next, the optical characteristics of the phase plates H2, H3, H4, and H5 and the polarizing plates H1 and H6 will be described.

In the semi-transmissive liquid crystal display apparatus A according to this embodiment, as described above, light passes through the third phase plate H4, the fourth phase plate H5, and the second polarizing plate H6 only in a transmissive mode. Therefore, the first phase plate H2, the second phase plate H3, and the first polarizing plate H1 are involved in the operation of the liquid crystal display apparatus in both the transmissive mode and a reflective mode, whereas the third phase plate H4, the fourth phase plate H5, and the second polarizing plate H6 are only involved in the operation of the liquid crystal display apparatus in the transmissive mode. There are four optimal combinations of optical characteristics of the phase plates H2, H3, H4, and H5, and the polarizing plates H1 and H6. The combinations will be described below.

Here, $\psi+N°$ representing the axial direction of the retardation axis of a phase plate (where N represents an integer) represents an angle N to the alignment direction $\psi$ of the liquid crystal layer. In other words, $\psi+N°$ represents that the axis has been rotated counterclockwise by N° from the alignment direction $\psi$ when viewed from one of the substrates. Furthermore, $\psi-N°$ represents that the axis has been rotated clockwise by N° from the alignment direction $\phi$ when viewed from the other substrate.

Moreover, $(\psi\pm N°)+n°$ represents an angle obtained by rotating the axis by n° in the counterclockwise direction, whereas $\psi\pm N°$ represents an angle obtained by rotating the axis by n° in the clockwise direction.

[First Combination]

The phase plates H2, H3, H4, and H5 are composed of uniaxially stretched norbornene-based resin (e.g., Zeonor (product of Zeon Corporation) or Arton (product of Japan Synthetic Rubber Co., Ltd.)) or polycarbonate film, and their retardation axes matches the stretching direction.

The retardation $\Delta nd_{RF1}$ of the first phase plate H2 is within the range of 250 to 290 nm (where the measured wavelength is 589 nm). If the retardation $\Delta nd_{RF1}$ is not within this range, a high contrast ratio or high luminance cannot be obtained in the transmissive mode and the reflective mode.

As shown in FIGS. 6 and 7, the retardation axis d of the first phase plate H2 is set so that the angle $\phi_{RF1}$ to the alignment direction $\psi$ is within the range of $(\psi+30°)-15°$ to $(\psi+30°)+15°$ when viewed from the incident direction of light. If the angle of the retardation axis d is not within this range, a high contrast ratio or high luminance cannot be obtained in the transmissive mode and the reflective mode.

The retardation $\Delta nd_{RF2}$ of the second phase plate H3 is within the range of 160 to 200 nm (where the measured wavelength is 589 nm). If the retardation $\Delta nd_{RF2}$ is not within this range, a high contrast ratio or high luminance cannot be obtained in the transmissive mode and the reflective mode.

As shown in FIGS. 6 and 7, the retardation axis e of the second phase plate H3 is set so that the angle $\phi_{RF2}$ to the alignment direction $\psi$ is within the range of $(\psi+90°)-15°$ to $(\psi+90°)+15°$ when viewed from the incident direction of light. If the angle of the retardation axis e is not within this range, a high contrast ratio or high luminance cannot be obtained in the transmissive mode and the reflective mode.

The retardation $\Delta nd_{RF3}$ of the third phase plate H4 is within the range of 160 to 200 nm (where the measured wavelength is 589 nm). If the retardation $\Delta nd_{RF3}$ is not within this range, a high contrast ratio or high luminance cannot be obtained in the transmissive mode and the reflective mode.

As shown in FIGS. 6 and 7, the retardation axis f of the third phase plate H4 is set so that the angle $\phi_{RF3}$ to the alignment direction $\psi$ is within the range of $(\psi+90°)-15°$ to $(\psi+90°)+15°$ when viewed from the incident direction of light. If the angle of the retardation axis f is not within this range, a high contrast ratio or high luminance cannot be obtained in the transmissive mode.

The retardation $\Delta nd_{RF4}$ of the fourth phase plate H5 is within the range of 250 to 290 nm (where the measured wavelength is 589 nm). If the retardation $\Delta nd_{RF4}$ is not within this range, a high contrast ratio or high luminance cannot be obtained in the transmissive mode and the reflective mode.

As shown in FIGS. 6 and 7, the retardation axis g of the fourth phase plate H5 is set so that the angle $\phi_{RF4}$ to the alignment direction $\psi$ is within the range of $(\psi+150°)-15°$ to $(\psi+150°)+15°$ when viewed from the incident direction of light. If the angle of the retardation axis g is not within this range, a high contrast ratio or high luminance cannot be obtained in the transmissive mode.

As shown in FIGS. 6 and 7, the absorption axis c of the first polarizing plate H1 is set so that the angle $\phi_{pol1}$ to the alignment direction $\psi$ is within the range of $(\psi+15°)-30°$ to $(\psi+15°)+30°$ when viewed from the incident direction of light. If the angle of the absorption axis c of the first polarizing plate H1 is not within this range, satisfactory white display at high luminance cannot be obtained in the transmissive mode and the reflective mode.

As shown in FIGS. 6 and 7, the absorption axis h of the second polarizing plate H6 is set so that the angle $\phi_{pol2}$ to the alignment direction $\psi$ is within the range of $(\psi+75°)-30°$ to $(\psi+75°)+30°$ when viewed from the incident direction of light. If the angle of the absorption axis h of the second polarizing plate H6 is not within this range, satisfactory white display at high luminance cannot be obtained in the transmissive mode.

[Second Combination]

As the same as the first combination, the phase plates H2, H3, H4, and H5 are composed of uniaxially stretched norbornene-based resin (e.g., Zeonor (product of Zeon Corporation) or Arton (product of Japan Synthetic Rubber Co., Ltd.)) or polycarbonate film, and their retardation axes match the stretching direction.

The retardation $\Delta nd_{RF1}$ of the first phase plate H2 is within the range of 250 to 290 nm (where the measured wavelength is 589 nm). If the retardation $\Delta nd_{RF1}$ is not within this range, a high contrast ratio or high luminance cannot be obtained in the transmissive mode and the reflective mode.

Figure 8:
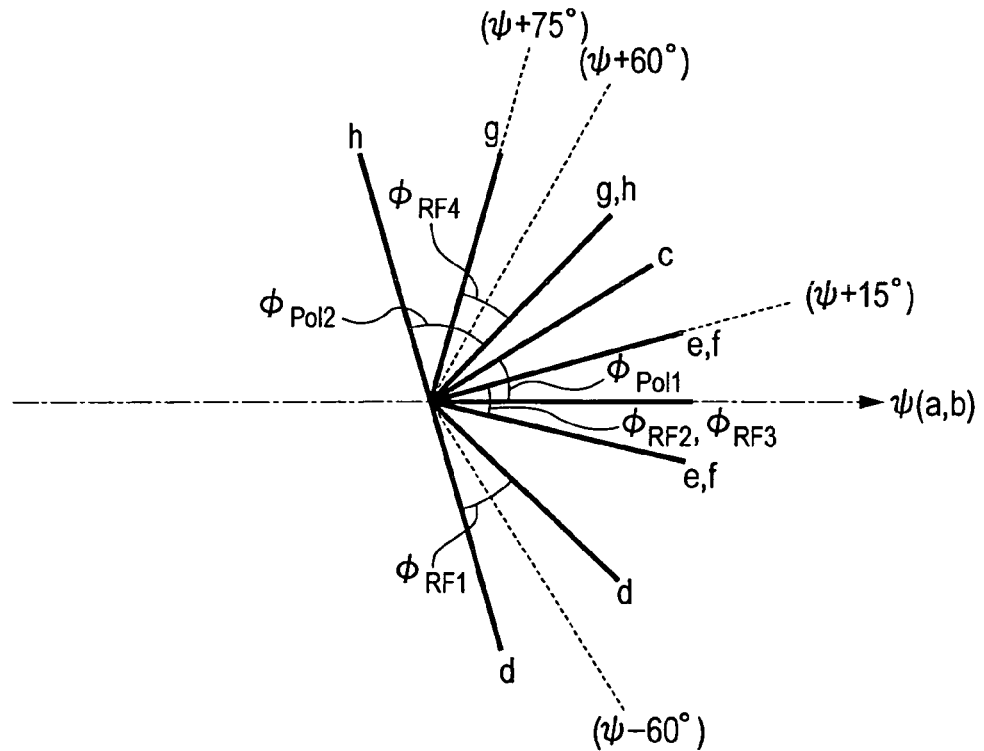
FIG. 8 is a plan view of the arrangements of a second combination of an absorption axis c of a first polarizing plate, a retardation axis d of a second phase plate, a retardation axis e of a first phase plate, an alignment direction a of a upper alignment film, an alignment direction b of a lower alignment film, a retardation axis f of a third phase plate, a retardation axis g of a fourth phase plate, and an absorption axis h of a second polarizing plate of a liquid crystal display apparatus according to an embodiment of the present invention.

As shown in FIG. 8, the retardation axis d of the first phase plate H2 is set so that the angle $\phi_{RF1}$ to the alignment direction $\psi$ is within the range of $(\psi+30°)-15°$ to $(\psi+30°)+15°$ when viewed from the incident direction of light. If the angle of the retardation axis d is not within this range, a high contrast ratio or high luminance cannot be obtained in the transmissive mode and the reflective mode.

The retardation $\Delta nd_{RF2}$ of the second phase plate H3 is within the range of 160 to 200 nm (where the measured wavelength is 589 nm). If the retardation $\Delta nd_{RF2}$ is not within this range, a high contrast ratio or high luminance cannot be obtained in the transmissive mode and the reflective mode.

As shown in FIG. 8, the retardation axis e of the second phase plate H3 is set so that the angle $\phi_{RF2}$ to the alignment direction $\psi$ is within the range of $(\psi+90°)-15°$ to $(\psi+90°)+15°$ when viewed from the incident direction of light. If the angle of the retardation axis e is not within this range, a high contrast ratio or high luminance cannot be obtained in the transmissive mode and the reflective mode.

The retardation $\Delta nd_{RF3}$ of the third phase plate H4 is within the range of 160 to 200 nm (where the measured wavelength is 589 nm). If the retardation $\Delta nd_{RF3}$ is not within this range, a high contrast ratio or high luminance cannot be obtained in the transmissive mode and the reflective mode.

As shown in FIG. 8, the retardation axis f of the third phase plate H4 is set so that the angle $\phi_{RF3}$ to the alignment direction $\psi$ is within the range of $(\phi+90°)-15°$ to $(\psi+90°)+15°$ when viewed from the incident direction of light. If the angle of the retardation axis f is not within this range, a high contrast ratio or high luminance cannot be obtained in the transmissive mode.

The retardation $\Delta nd_{RF4}$ of the fourth phase plate H5 is within the range of 250 to 290 nm (where the measured wavelength is 589 nm). If the retardation $\Delta nd_{RF4}$ is not within this range, a high contrast ratio or high luminance cannot be obtained in the transmissive mode and the reflective mode.

As shown in FIG. 8, the retardation axis g of the fourth phase plate H5 is set so that the angle $\phi_{RF4}$ to the alignment direction $\psi$ is within the range of $(\psi+150°)-15°$ to $(\psi+150°)+15°$ when viewed from the incident direction of light. If the angle of the retardation axis g is not within this range, a high contrast ratio or high luminance cannot be obtained in the transmissive mode.

As shown in FIG. 8, the absorption axis c of the first polarizing plate H1 is set so that the angle $\phi_{pol1}$ to the alignment direction $\psi$ is within the range of $(\psi+105°)-30°$ to $(\psi+105°)+30°$ when viewed from the incident direction of light. If the angle of the absorption axis c of the first polarizing plate H1 is not within this range, satisfactory white display at high luminance cannot be obtained in the transmissive mode and the reflective mode.

As shown in FIG. 8, the absorption axis h of the second polarizing plate H6 is set so that the angle $\phi_{pol2}$ to the alignment direction $\psi$ is within the range of $(\psi+165°)-30°$ to $(\psi+165°)+30°$ when viewed from the incident direction of light. If the angle of the absorption axis h of the second polarizing plate H6 is not within this range, satisfactory white display at high luminance cannot be obtained in the transmissive mode.

[Third Combination]

As the same as the first combination, the phase plates H2, H3, H4, and H5 are composed of uniaxially stretched norbornene-based resin (e.g., Zeonor (product of Zeon Corporation) or Arton (product of Japan Synthetic Rubber Co., Ltd.)) or polycarbonate film, and their retardation axes match the stretching direction.

The retardation $\Delta nd_{RF1}$ of the first phase plate H2 is within the range of 250 to 290 nm (where the measured wavelength is 589 nm). If the retardation $\Delta nd_{RF1}$ is not within this range, a high contrast ratio or high luminance cannot be obtained in the transmissive mode and the reflective mode.

Figure 9:
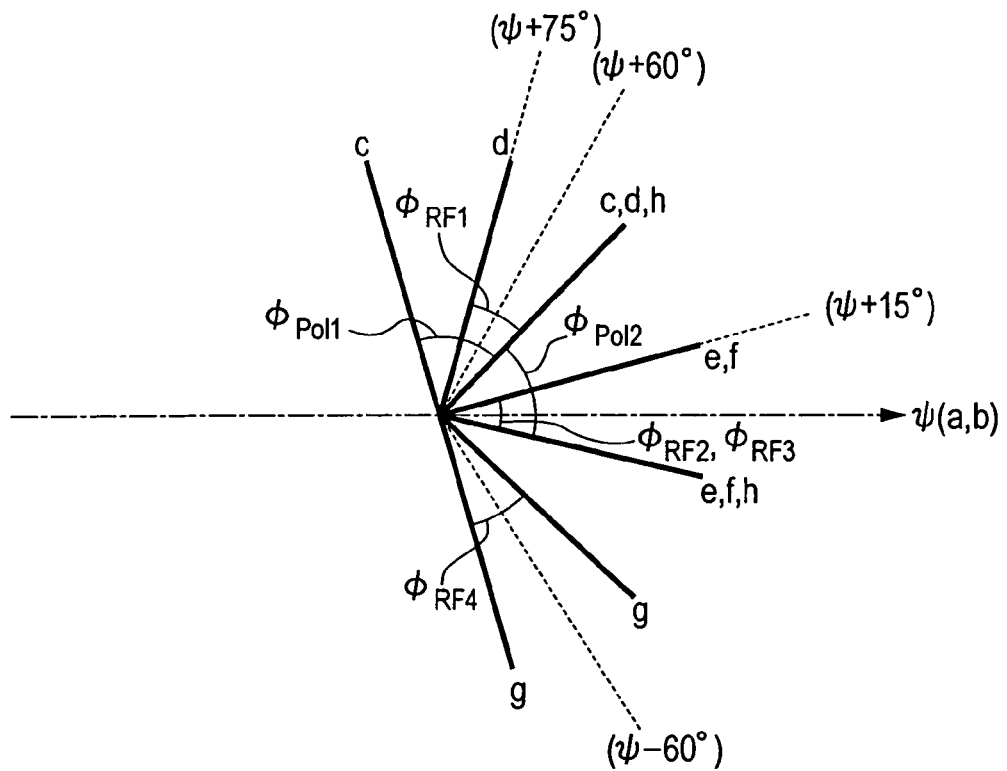
FIG. 9 is a plan view of the arrangements of a third combination of an absorption axis c of a first polarizing plate, a retardation axis d of a second phase plate, a retardation axis e of a first phase plate, an alignment direction a of a upper alignment film, an alignment direction b of a lower alignment film, a retardation axis f of a third phase plate, a retardation axis g of a fourth phase plate, and an absorption axis h of a second polarizing plate of a liquid crystal display apparatus according to an embodiment of the present invention.

As shown in FIG. 9, the retardation axis d of the first phase plate H2 is set so that the angle $\phi_{RF1}$ to the alignment direction $\psi$ is within the range of $(\psi+150°)-15°$ to $(\psi+150°)+15°$ when viewed from the incident direction of light. If the angle of the retardation axis d is not within this range, a high contrast ratio or high luminance cannot be obtained in the transmissive mode and the reflective mode.

The retardation $\Delta nd_{RF2}$ of the second phase plate H3 is within the range of 160 to 200 nm (where the measured wavelength is 589 nm). If the retardation $\Delta nd_{RF2}$ is not within this range, a high contrast ratio or high luminance cannot be obtained in the transmissive mode and the reflective mode.

As shown in FIG. 9, the retardation axis e of the second phase plate H3 is set so that the angle $\phi_{RF2}$ to the alignment direction $\psi$ is within the range of $(\psi+90°)-15°$ to $(\psi+90°)+15°$ when viewed from the incident direction of light. If the angle of the retardation axis e is not within this range, a high contrast ratio or high luminance cannot be obtained in the transmissive mode and the reflective mode.

The retardation $\Delta nd_{RF3}$ of the third phase plate H4 is within the range of 160 to 200 nm (where the measured wavelength is 589 nm). If the retardation $\Delta nd_{RF3}$ is not within this range, a high contrast ratio or high luminance cannot be obtained in the transmissive mode and the reflective mode.

As shown in FIG. 9, the retardation axis f of the third phase plate H4 is set so that the angle $\phi_{RF3}$ to the alignment direction $\psi$ is within the range of $(\psi+90°)-15°$ to $(\psi+90°)+15°$ when viewed from the incident direction of light. If the angle of the retardation axis f is not within this range, a high contrast ratio or high luminance cannot be obtained in the transmissive mode.

The retardation $\Delta nd_{RF4}$ of the fourth phase plate H5 is within the range of 250 to 290 nm (where the measured wavelength is 589 nm). If the retardation $\Delta nd_{RF4}$ is not within this range, a high contrast ratio or high luminance cannot be obtained in the transmissive mode and the reflective mode.

As shown in FIG. 9, the retardation axis g of the fourth phase plate H5 is set so that the angle $\phi_{RF4}$ to the alignment direction $\psi$ is within the range of $(\psi+30°)-15°$ to $(\psi+30°)+15°$ when viewed from the incident direction of light. If the angle of the retardation axis g is not within this range, a high contrast ratio or high luminance cannot be obtained in the transmissive mode.

As shown in FIG. 9, the absorption axis c of the first polarizing plate H1 is set so that the angle $\phi_{pol1}$ to the alignment direction $\psi$ is within the range of $(\psi+165°)-30°$ to $(\psi+165°)+30°$ when viewed from the incident direction of light. If the angle of the absorption axis c of the first polarizing plate H1 is not within this range, satisfactory white display at high luminance cannot be obtained in the transmissive mode and the reflective mode.

As shown in FIG. 9, the absorption axis h of the second polarizing plate H6 is set so that the angle $\phi_{pol2}$ to the alignment direction $\psi$ is within the range of $(\psi+105°)-30°$ to $(\psi+105°)+30°$ when viewed from the incident direction of light. If the angle of the absorption axis h of the second polarizing plate H6 is not within this range, satisfactory white display at high luminance cannot be obtained in the transmissive mode.

[Fourth Combination]

As the same as the first combination, the phase plates H2, H3, H4, and H5 are composed of uniaxially stretched norbornene-based resin (e.g., Zeonor (product of Zeon Corporation) or Arton (product of Japan Synthetic Rubber Co., Ltd.)) or polycarbonate film, and their retardation axes match the stretching direction.

The retardation $\Delta nd_{RF1}$ of the first phase plate H2 is within the range of 250 to 290 nm (where the measured wavelength is 589 nm). If the retardation $\Delta nd_{RF1}$ is not within this range, a high contrast ratio or high luminance cannot be obtained in the transmissive mode and the reflective mode.

Figure 10:
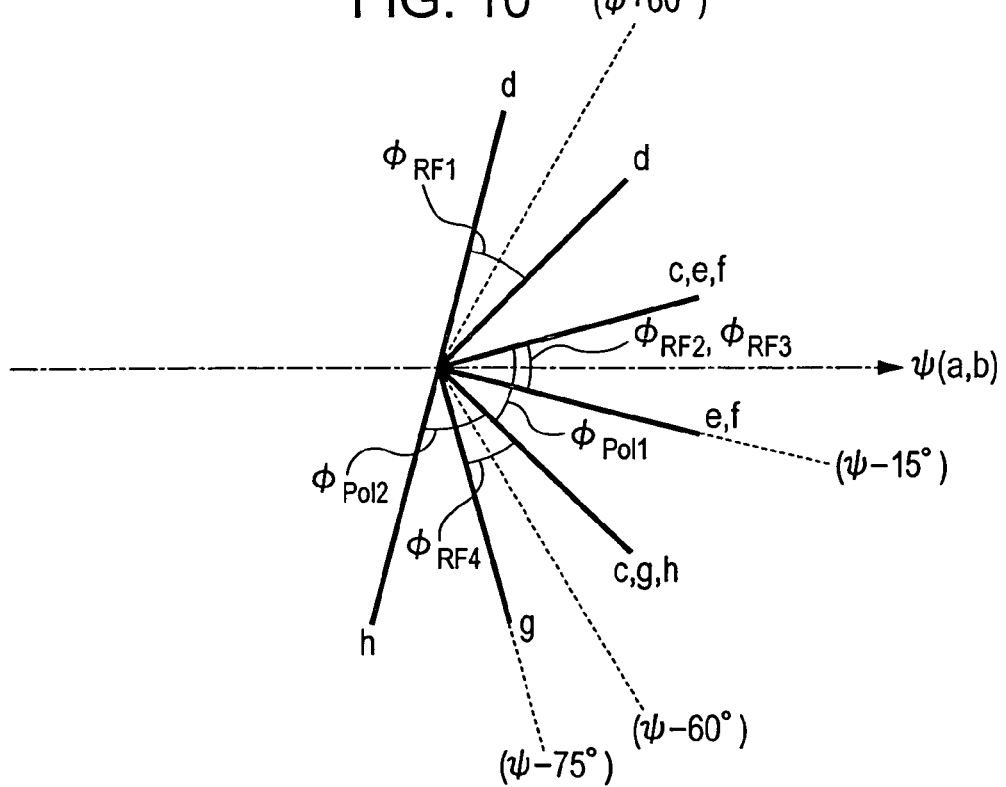
FIG. 10 is a plan view of the arrangements of a fourth combination of an absorption axis c of a first polarizing plate, a retardation axis d of a second phase plate, a retardation axis e of a first phase plate, an alignment direction a of a upper alignment film, an alignment direction b of a lower alignment film, a retardation axis f of a third phase plate, a retardation axis g of a fourth phase plate, and an absorption axis h of a second polarizing plate of a liquid crystal display apparatus according to an embodiment of the present invention.

As shown in FIG. 10, the retardation axis d of the first phase plate H2 is set so that the angle $\phi_{RF1}$ to the alignment direction ψ is within the range of (ψ+150°)−15° to (ψ+150°)+15° when viewed from the incident direction of light. If the angle of the retardation axis d is not within this range, a high contrast ratio or high luminance cannot be obtained in the transmissive mode and the reflective mode.

The retardation $\Delta nd_{RF2}$ of the second phase plate H3 is within the range of 160 to 200 nm (where the measured wavelength is 589 nm). If the retardation $\Delta nd_{RF2}$ is not within this range, a high contrast ratio or high luminance cannot be obtained in the transmissive mode and the reflective mode.

As shown in FIG. 10, the retardation axis e of the second phase plate H3 is set so that the angle $\phi_{RF2}$ to the alignment direction ψ is within the range of (ψ+90°)−15° to (ψ+90°)+15° when viewed from the incident direction of light. If the angle of the retardation axis e is not within this range, a high contrast ratio or high luminance cannot be obtained in the transmissive mode and the reflective mode.

The retardation $\Delta nd_{RF3}$ of the third phase plate H4 is within the range of 160 to 200 nm (where the measured wavelength is 589 nm). If the retardation $\Delta nd_{RF3}$ is not within this range, a high contrast ratio or high luminance cannot be obtained in the transmissive mode and the reflective mode.

As shown in FIG. 10, the retardation axis f of the third phase plate H4 is set so that the angle $\phi_{RF3}$ to the alignment direction ψ is within the range of (ψ+90°)−15° to (ψ+90°)+15° when viewed from the incident direction of light. If the angle of the retardation axis f is not within this range, a high contrast ratio or high luminance cannot be obtained in the transmissive mode.

The retardation $\Delta nd_{RF4}$ of the fourth phase plate H5 is within the range of 250 to 290 nm (where the measured wavelength is 589 nm). If the retardation $\Delta nd_{RF4}$ is not within this range, a high contrast ratio or high luminance cannot be obtained in the transmissive mode and the reflective mode.

As shown in FIG. 10, the retardation axis g of the fourth phase plate H5 is set so that the angle $\phi_{RF4}$ to the alignment direction ψ is within the range of (ψ+30°)−15° to (ψ+30°)+15° when viewed from the incident direction of light. If the angle of the retardation axis g is not within this range, a high contrast ratio or high luminance cannot be obtained in the transmissive mode.

As shown in FIG. 10, the absorption axis c of the first polarizing plate H1 is set so that the angle $\phi_{pol1}$ to the alignment direction ψ is within the range of (ψ+75°)−30° to (ψ+75°)+30° when viewed from the incident direction of light. If the angle of the absorption axis c of the first polarizing plate H1 is not within this range, satisfactory white display at high luminance cannot be obtained in the transmissive mode and the reflective mode.

As shown in FIG. 10, the absorption axis h of the second polarizing plate H6 is set so that the angle $\phi_{pol2}$ to the alignment direction ψ is within the range of (ψ+15°)−30° to (ψ+15°)+30° when viewed from the incident direction of light. If the angle of the absorption axis h of the second polarizing plate H6 is not within this range, satisfactory white display at high luminance cannot be obtained in the transmissive mode.

Next, details of the reflective body 20 will be described.

Figure 11:
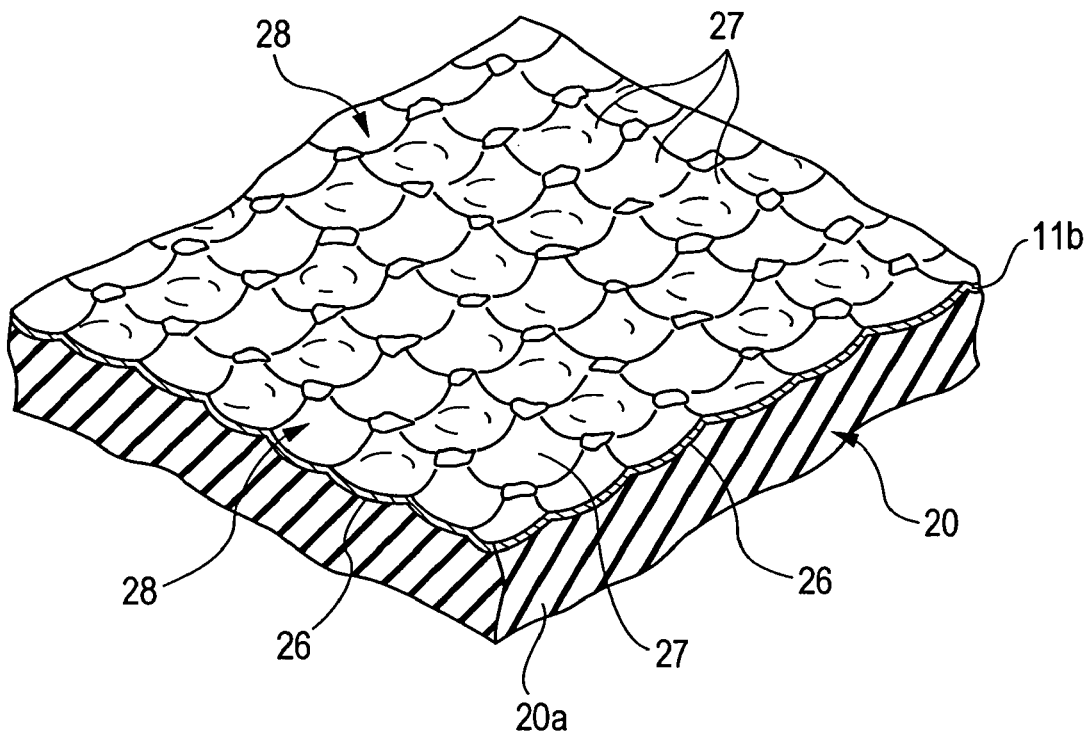
FIG. 11 is a perspective view of the shape of depressions of a reflective body included the liquid cell.

As shown in FIGS. 2 and 11, at positions corresponding to pixel areas on the surface of the insulating film 20a constituting the reflective body 20, a plurality of depressions 27 formed by pressuring bonding a transfer mold to the surface of the insulating film 20a is provided. As shown in FIG. 11, the plurality of depressions 27 provides a predetermined surface depression pattern 28 to the reflective pixel electrodes 11b so as to partially disperse light incident on the liquid crystal panel by the plurality of depressions 27 formed on the reflective pixel electrodes 11b. In this way, diffuse reflection of light is possible for obtaining a brighter display having a wider observation range. As shown in FIG. 11, the depressions 27 are disposed closely to each other so that the inner surfaces of adjacent depressions 27 are partially connected at the side of the opening.

Figure 12:
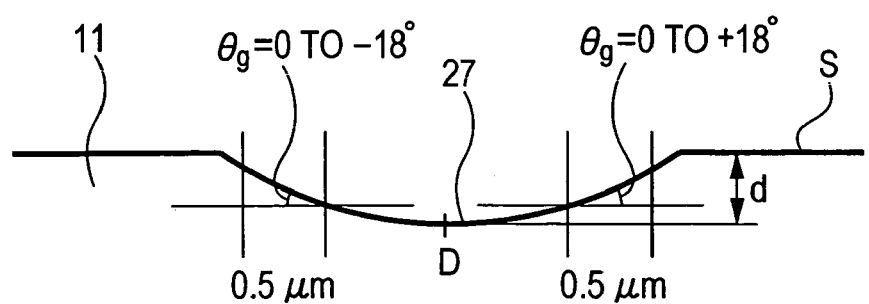
FIG. 12 is a schematic view of the cross-sectional shape of the depressions shown in FIG. 11.

According to this embodiment, each of the inner surfaces of the depressions 27 is spherical. The luminance distribution of the diffuse reflection light incident on the reflective pixel electrodes 11b at a predetermined angle (e.g., 30°) is substantially symmetric with respect to the specular reflection angle. More specifically, as shown in FIG. 12, the angle of inclination θg of the inner surfaces of the depressions 27 is, for example, within the range of −18° to +18°. The pitch of adjacent depressions 27 is random so as to prevent the generation of moiré fringes caused of the alignment of the depressions 27.

To facilitate production, the diameter of each of the depressions 27 is set to 5 to 100 μm. The depth of each of the depressions 27 is set to 0.1 to 3 μm.

In the plan view of FIG. 4, the depressions 27 are not shown on the reflective pixel electrodes 11b so as to simplify the drawing. The dimensions of the outer periphery of the pixel electrodes 11 in a standard liquid crystal panel are set so that the length is 100 to 200 μm and the width is 30 to 90 μm. To illustrate the size of the depressions 27 relative to the reflective pixel electrodes 11b, the depressions 27 are illustrated in dotted lines in one of the pixels shown in FIG. 4.

Here, the "depth of the depressions 27" refers to the distance from the surface of the reflective pixel electrodes 11b where the depressions 27 are not provide to the bottom of the depressions 27. The "pitch of adjacent depressions 27" refers to the distance between the centers of the circular depressions 27 when viewed from the top. The "angle of inclination θg of the inner surfaces of the depressions 27" refers to the angle θg to the horizontal plane of the inclined surface in a minute area having a width of 0.5 μm taken from a predetermined area in the inner surfaces of the depressions 27 (i.e., the angle θg to the surface of the substrate 6), as shown in FIG. 12. The angle θg is positive or negative with respect to a normal line extending perpendicularly from an area on the surface of the reflective pixel electrodes 11b where the depressions 27 are not provided. For example, in FIG. 12, the right side of the inclined surface is defined as a positive angle and the left side is defined as a negative angle.

As described above in detail, the optical characteristics of the liquid crystal cell 1, the phase plates H2, H3, H4, and H5, and the polarizing plates H1 and H6 of the semi-transmissive liquid crystal display apparatus A according to this embodiment are set within the above-mentioned ranges. Therefore, the semi-transmissive liquid crystal display apparatus A has a high contrast ratio and high luminance in the transmissive and reflective modes.

Moreover, the display of the transmissive parts 30 and the reflective parts 35 are uniform so as to prevent unevenness in the display. In particular, unevenness in the contrast can be prevented.

Since the thickness of the reflective color filters 42a in the reflective parts 35 is one-half of the thickness of the transparent color filters 42c in transmissive parts 30, unevenness in the colors in the transmissive parts 30 and the reflective parts 35 can be prevented so as to make the contrast uniform and to increase the luminance.

Since the transparent resin layers 42b in the reflective parts 35 and the transparent color filters 42c in the transmissive parts 30 are flush on the side of the liquid crystal layer 5, the cell gap in the liquid crystal cell 1 can be easily controlled.

Since the thickness $d_4$ of the liquid crystal layer 5 in the reflective part 35 is twice the thickness $d_3$ of the liquid crystal layer 5 in the transmissive part 30, the light path length of the light passing through the liquid crystal layer 5 in the reflective part 35 and the light path length of the light passing through the liquid crystal layer 5 in the transmissive part 30 are substantially the same.

EXAMPLES

The embodiment of the present invention will be described in more detail below by presenting examples. However, the present invention is not limited to these examples.

The display characteristics of the semi-transmissive liquid crystal display apparatus illustrated in FIGS. 1 to 12 in a reflective mode and a transmissive mode were studied.

As the upper and lower alignment films constituting the liquid crystal cell, PIA-5560 (product of Chisso Corporation) was used. The alignment direction a of the alignment film provided on the upper substrate was the same as the alignment direction b of the transmissive alignment film, and the alignment direction of the reflective alignment film was a perpendicular direction. As the liquid crystal included in the liquid crystal layer, AP-5517XX (product of Chisso Petrochemical Corporation) was used. The first to fourth phase plates were composed of Zeonor.

A reflective body was prepared by curing an acrylic-based photosensitive resin substrate (resin substrate for reflective body) having a rough surface molded by a silicon mold having a rough surface by irradiating the substrate with ultraviolet rays and then providing an aluminum (Al) film (reflective pixel electrode) on the substrate. The depressions causing the roughness of the surface of the reflective body are spherical, as shown in FIGS. 11 and 12.

The angles of $\Delta nd_{LR}$ and $\Delta nd_{LT}$ of the liquid crystal cell (measured wavelength 589 nm), $\Delta nd_{RF1}$ to $\Delta nd_{RF4}$ of the first to fourth phase plates, and the retardation axis d to g of the first to fourth phase plates to the alignment direction ψ and the angle of the absorption axes c and g of the first and second polarizing plates to the alignment direction ψ were set as shown in Table 1 below (first to fifth examples).

The luminance, the contrast ratio, and the distance from the light source of the reflective liquid crystal display apparatuses according to the first to fifth examples in reflective and transmissive modes were measured.

For the measurement in the reflective mode, the light source, the liquid crystal cell, and the backlight were stacked in this order and the contrast ratio was measured by measuring the luminance of the white display (where the applied voltage is 2.10 V) in a normally white (N/W) mode and the luminance of a black display (where the applied voltage is 5.5 V) of light reflected in the Z direction, shown in FIG. 6, received at an acceptance angle of 0 degrees when the light from the light source was emitted from 90 degree angle of direction to the liquid crystal cell and a −30 degree direction to the Z axis (normal line), shown in FIG. 6.

For the measurement in the transmissive mode, the light source, the liquid crystal cell, and the backlight were stacked in this order and the contrast ratio was measured by measuring the luminance of the white display (where the applied voltage is 2.1 V) in a normally white (N/W) mode and the luminance of a black display (where the applied voltage is 5.1 V) of light received at an acceptance angle of 0 degrees when the light from the backlight was incident on the liquid crystal cell and transmitted in the Z direction.

From the measurement results in the transmissive and reflective modes, the display apparatuses according to the first to fifth examples were determined to be either non-defective (indicated by "O" in the table) or defective (indicated by "X" in the table). The criteria for a non-defective apparatus are: transmittance y≧30%; contrast ratio≧100; and distance from light source≦0.03 (in a XY chromaticity coordinates). When any one or more of the criteria is not met, the apparatus is determined as being defective. The results are shown in Table 2.

TABLE 1

| | First Polarization Plate | First Phase Plate | | Second Phase Plate | | Retardation at Reflective Part | Retardation at Transmissive Part |
|---|---|---|---|---|---|---|---|
| | Absorption Axis c (°) | Retardation $\Delta nd_{RF1}$ (nm) | Retardation Axis d (°) | Retardation $\Delta nd_{RF2}$ (nm) | Retardation Axis e (°) | $\Delta nd_{LR}$ (nm) | $\Delta nd_{LT}$ (nm) |
| 1st Example | (ψ − 75°) | 275 | (ψ − 60°) | 100 | (ψ − 0°) | 85 | 810 |
| 2nd Example | (ψ − 75°) | 275 | (ψ − 60°) | 100 | (ψ − 0°) | 100 | 860 |
| 3rd Example | (ψ − 75°) | 275 | (ψ − 60°) | 100 | (ψ − 0°) | 120 | 950 |
| 4th Example | (ψ − 75°) | 265 | (ψ − 60°) | 100 | (ψ − 0°) | 140 | 1060 |
| 5th Example | (ψ − 75°) | 265 | (ψ − 60°) | 100 | (ψ − 0°) | 170 | 1250 |

| | Third Phase Plate | | Fourth Phase Plate | | Second Polarizing Plate |
|---|---|---|---|---|---|
| | Retardation $\Delta nd_{RF3}$ (nm) | Retardation Axis f (°) | Retardation $\Delta nd_{RF4}$ (nm) | Retardation Axis g (°) | Absorption Axis h (°) |
| 1st Example | 100 | (ψ − 0°) | 275 | (ψ − 60°) | (ψ + 15°) |
| 2nd | 100 | (ψ − 0°) | 275 | (ψ − 60°) | (ψ + 15°) |

TABLE 1-continued

| | | | | | |
|---|---|---|---|---|---|
| 3rd Example | 100 | (ψ – 0°) | 275 | (ψ – 60°) | (ψ + 15°) |
| 4th Example | 100 | (ψ – 0°) | 275 | (ψ – 60°) | (ψ + 15°) |
| 5th Example | 100 | (ψ – 0°) | 275 | (ψ – 60°) | (ψ + 15°) |

TABLE 2

| | Reflective Part | | | Transmissive Part | | | Defective or Non-defective |
|---|---|---|---|---|---|---|---|
| | Reflectance | Contrast Ratio | Distance from Light Source | Reflectance | Contrast Ratio | Distance from Light Source | |
| 1st Example | 20.4 | 200.1 | 0.044 | 34.8 | 300.1 | 0.045 | X |
| 2nd Example | 28.8 | 240.3 | 0.038 | 34.9 | 400.2 | 0.038 | X |
| 3rd Example | 33.3 | 320.4 | 0.021 | 35.2 | 500.3 | 0.018 | ○ |
| 4th Example | 33.4 | 290.7 | 0.028 | 35.4 | 480.6 | 0.025 | ○ |
| 5th Example | 33.6 | 260.8 | 0.033 | 35.5 | 448.7 | 0.041 | X |

As apparent from the results shown in Tables 1 and 2, the display apparatuses according to the first, second, and fifth examples were determined as defective since the $\Delta nd_{LR}$ and $\Delta nd_{LT}$ of the liquid crystal cell were not within the preferable range and, thus, the contrast ratio was too small.

The other apparatuses according to the third and fourth examples were determined as non-defective since the optical characteristics of the liquid crystal cell, the first to fourth phase plates, and the first and second polarizing plates were all within the preferable range and, thus, have excellent luminance and a satisfactory contrast ratio.

What is claimed is:

1. A liquid crystal display apparatus comprising:
a liquid crystal cell including a liquid crystal layer interposed between a first transparent substrate and a second transparent substrate, wherein a common electrode and a first alignment film are stacked, in this order, on an inner side of the first transparent substrate, a plurality of switching elements and a plurality of pixel electrodes connected to the plurality of switching elements are disposed on an inner side of the second transparent substrate, and a second alignment film is disposed on the switching elements and the pixel electrodes;
a second phase plate, a first phase plate, and a first polarizing plate stacked, in this order, on an outer side of the first transparent substrate; and
a third phase plate, a fourth phase plate, and a second polarizing plate stacked, in this order, on an outer side of the second transparent substrate, wherein:
the liquid crystal cell has a plurality of pixel areas corresponding to the pixel electrodes and the pixel electrodes in predetermined pixel areas are reflective, the predetermined pixel areas being a reflective part configured to reflect incident light from the first transparent substrate and pixel areas other than the predetermined pixel areas being a transmissive part configured to pass light from the second transparent substrate to the first transparent substrate, and
the liquid crystal cell, the first to fourth phase plates, and the first and second polarizing plates having the following optical characteristics:
an axial direction of an absorption axis c of the first polarizing plate is within the range of (ψ+15°)−30° to (ψ+15°)+30°;
retardation ($\Delta nd_{RF1}$) of the first phase plate is within the range of 250 to 290 nm;
an axial direction of a retardation axis d of the first phase plate is within the range of (ψ+30°)−15° to (ψ+30°)+15°;
retardation ($\Delta nd_{RF2}$) of the second phase plate is within the range of 160 to 200 nm;
an axial direction of a retardation axis e of the second phase plate is within the range of (ψ+90°)−15° to (ψ+90°)+15°;
retardation ($\Delta nd_{LT}$) of the transmissive part of the liquid crystal cell is within the range of 900 to 1,100 nm;
retardation ($\Delta nd_{LR}$) of the reflective part of the liquid crystal cell is within the range of 115 to 145 nm;
retardation ($\Delta nd_{RF3}$) of the third phase plate is within the range of 160 to 200 nm;
an axial direction of a retardation axis f of the third phase plate is within the range of (ψ+90°)−15° to (ψ+90°)+15°;
retardation ($\Delta nd_{RF4}$) of the fourth phase plate is within the range of 250 to 290 nm;
an axial direction of a retardation axis g of the fourth phase plate is within the range of (ψ+150°)−15° to (ψ+150°)+15°; and
an axial direction of an absorption axis h of the second polarizing plate is within the range of (ψ+75°)−30° to (ψ+75°)+30°,
where the axial direction (ψ+N°) (N representing an integer) represents an angle N to an alignment direction ψ of the liquid crystal, (ψ+N°) represents the angle N° to the alignment direction ψ in the counterclockwise direction with respect to the first substrate, and (ψ−N°) represents the angle N° to the alignment direction ψ in the clockwise direction with respect to the first substrate.

2. The liquid crystal display apparatus according to claim 1, wherein:

the transmissive part operates in a mode in which the alignments of the first and second alignment films in the transmissive part have horizontal alignments and the liquid crystal molecules included the liquid crystal layer are in a bent alignment when a voltage is applied, and the reflective part operates in a mode in which the one of the first and second alignment films in the reflective part has a perpendicular alignment, the other alignment film has a horizontal alignment, and the liquid crystal molecules included the liquid crystal layer are in a hybrid alignment when a voltage is applied.

3. The liquid crystal display apparatus according to claim 1, wherein the thickness of the liquid crystal layer in the transmissive part is twice the thickness of the liquid crystal layer in the reflective part.

4. The liquid crystal display apparatus according to claim 1, wherein the pixel electrodes in the reflective part are reflective pixel electrodes composed of a metal film and the pixel electrodes in the transmissive part are transparent pixel electrodes composed of a transparent conductive film.

5. The liquid crystal display apparatus according to claim 1, wherein a color filter is interposed between the first transparent substrate and the common electrode, and the color filter in the reflective part is thinner than the color filter in the transmissive part.

6. The liquid crystal display apparatus according to claim 1, wherein a color filter is interposed between the first transparent substrate and the common electrode, a transparent resin film is stacked on the color filter on the side facing the liquid crystal layer in the reflective part, and the total thickness of the color filter and the transparent resin layer in the reflective part is the same as the thickness of the color filter in the transmissive part.

7. The liquid crystal display apparatus according to claim 4, wherein a sidewall of the reflective part is formed adjacent to a periphery of the transmissive part and an angle of inclination of the sidewall is within the range of 25° to 55°.

* * * * *